(12) United States Patent
Harada et al.

(10) Patent No.: US 11,367,897 B2
(45) Date of Patent: Jun. 21, 2022

(54) SOLID ELECTROLYTE MATERIAL, ELECTRODE, BATTERY, BATTERY PACK, AND VEHICLE

(71) Applicant: Kabushiki Kaisha Toshiba, Minato-ku (JP)

(72) Inventors: Yasuhiro Harada, Isehara (JP); Tomoe Kusama, Tokyo (JP); Norio Takami, Yokohama (JP); Kazuomi Yoshima, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 232 days.

(21) Appl. No.: 16/564,056

(22) Filed: Sep. 9, 2019

(65) Prior Publication Data

US 2020/0295400 A1     Sep. 17, 2020

(30) Foreign Application Priority Data

Mar. 13, 2019 (JP) .............................. JP2019-045784
Sep. 4, 2019 (JP) .............................. JP2019-161420

(51) Int. Cl.
*H01M 10/0562* (2010.01)
*H01M 4/58* (2010.01)
*H01M 10/052* (2010.01)

(52) U.S. Cl.
CPC ..... *H01M 10/0562* (2013.01); *H01M 4/5825* (2013.01); *H01M 10/052* (2013.01)

(58) Field of Classification Search
CPC ................................................. H01M 10/0562
See application file for complete search history.

(56) References Cited

U.S. PATENT DOCUMENTS 6,994,807 B2 * 2/2006 Tanner ................ H01M 8/1246
                                                                        252/518.1
2011/0086289 A1 * 4/2011 Venkataraman .... H01M 8/1246
                                                                        429/495

(Continued)

FOREIGN PATENT DOCUMENTS

JP      2018-049701 A    3/2018
WO    WO 2013/140574 A1   9/2013

OTHER PUBLICATIONS

Kawakami, Y, et al., "Ionic conduction of lithium for perovskite type compounds, $(Li_{0.05}La_{0.317})_{1-x}Sr_{0.5x}NbO_3$, $(Li_{0.1}La_{0.3})_{1-x}Sr_{0.5x}NbO_3$ and $(Li_{0.25}La_{0.25})_{1-x}M_{0.5x}NbO_3$ (M=Ca and Sr)", Solid State Ionics, vol. 110, 1998, pp. 187-192.

(Continued)

*Primary Examiner* — Eric R Smith
(74) *Attorney, Agent, or Firm* — Oblon, McClelland, Maier & Neustadt, L.L.P.

(57) ABSTRACT

According to one embodiment, provided is a solid electrolyte material including an oxide, the oxide including an octahedral coordination structure that includes a metal element M and oxygen atoms arranged centering on the metal element M. The metal element M includes Nb and Ta. A mass ratio $\alpha_{Ta}/\alpha_{Nb}$ of a mass $\alpha_{Ta}$ of Ta to a mass $\alpha_{Nb}$ of Nb is within a range of $5\times10^{-5} \leq \alpha_{Ta}/\alpha_{Nb} \leq 3\times10^{-3}$.

16 Claims, 9 Drawing Sheets

(56) References Cited

U.S. PATENT DOCUMENTS

| | | |
|---|---|---|
| 2014/0193718 A1 | 7/2014 | Harada et al. |
| 2016/0079588 A1* | 3/2016 | Harada ............... H01M 4/485 429/61 |
| 2016/0233032 A1* | 8/2016 | Ono ..................... H01G 11/68 |
| 2017/0222272 A1* | 8/2017 | Takami ............... H01M 50/20 |
| 2018/0083314 A1 | 3/2018 | Harada et al. |
| 2018/0175396 A1* | 6/2018 | Jacobs ............... H01M 4/9033 |
| 2018/0301754 A1* | 10/2018 | Badding ............ C04B 35/6261 |
| 2019/0237765 A1* | 8/2019 | Brown .................. C01B 33/26 |

OTHER PUBLICATIONS

Xie, H, et al., "NASICON-type $Li_{1+2x}Zr_{2-x}Ca_x(PO_4)_3$ with high ionic conductivity at room temperature", RSC Advances, vol. 1, 2011, pp. 1728-1731.

* cited by examiner

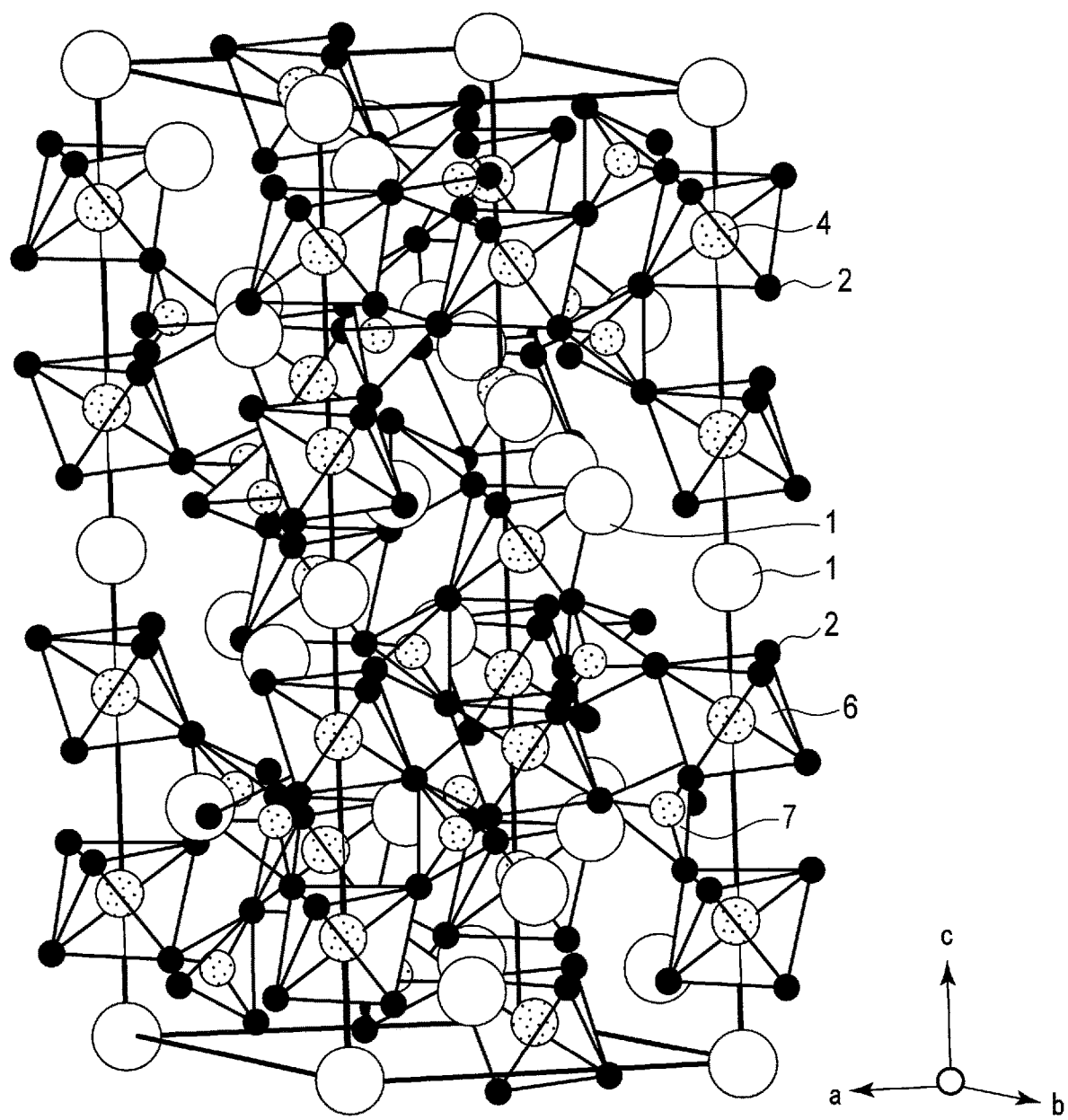
F I G. 2

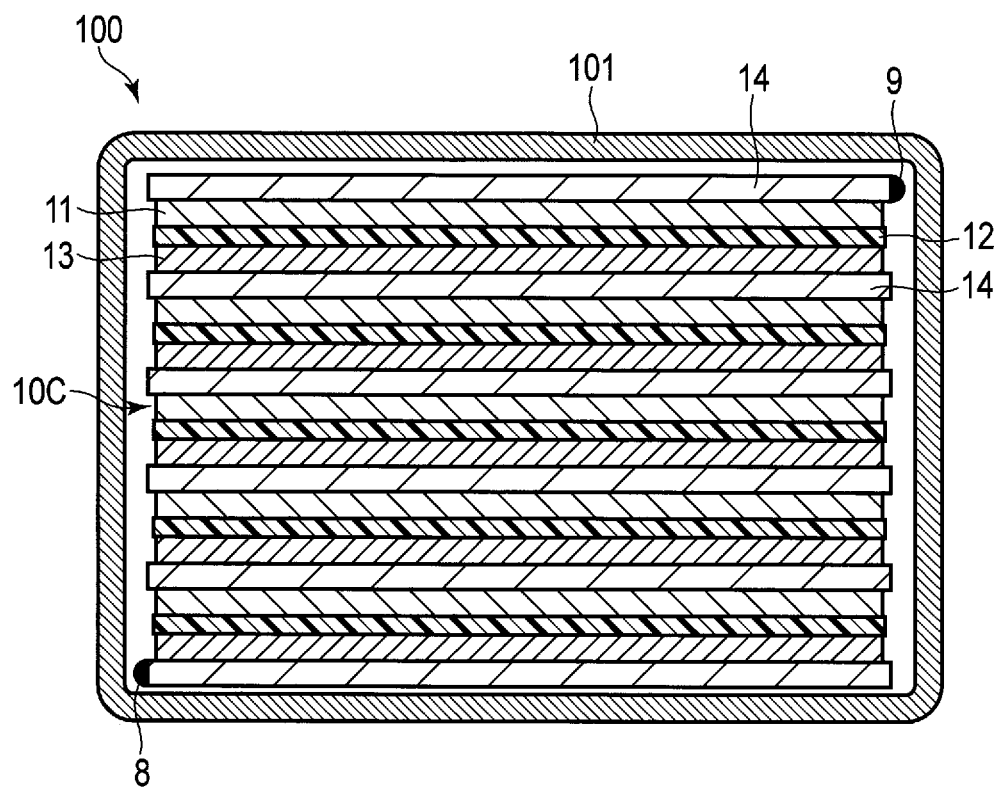
F I G. 5

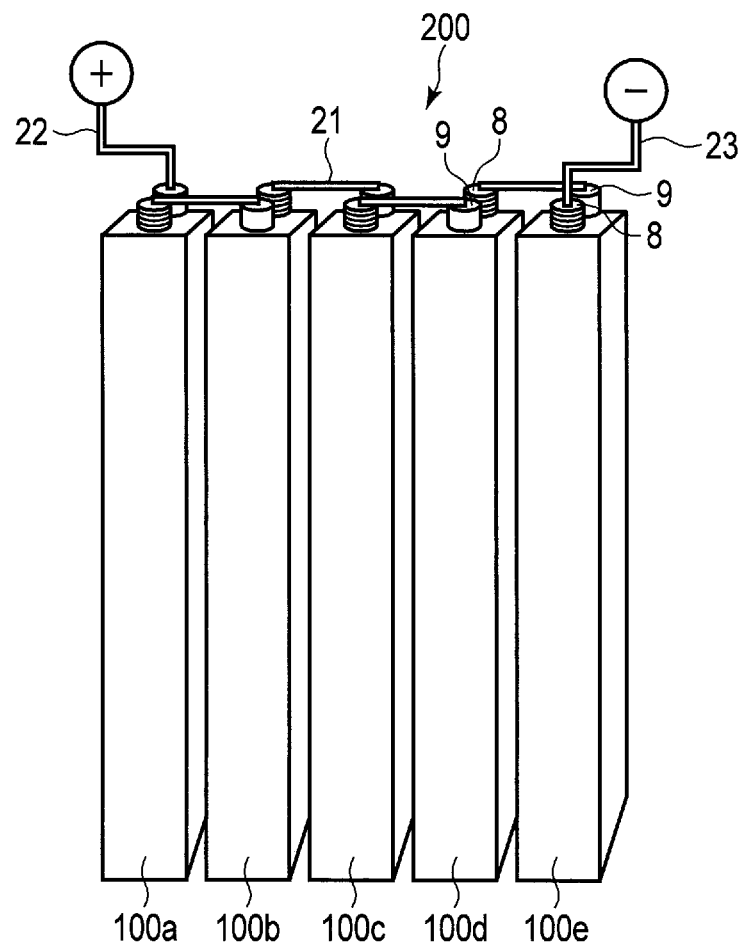
F I G. 9

SOLID ELECTROLYTE MATERIAL, ELECTRODE, BATTERY, BATTERY PACK, AND VEHICLE

CROSS-REFERENCE TO RELATED APPLICATION

This application is based upon and claims the benefit of priority from Japanese Patent Application No. 2019-045784, filed Mar. 13, 2019, and Japanese Patent Application No. 2019-161420, filed Sep. 4, 2019; the entire contents of all of which are incorporated herein by reference.

FIELD

Embodiments relate to a solid electrolyte material, an electrode, a battery, a battery pack, and a vehicle.

BACKGROUND

In recent years, lithium ion secondary batteries with high energy density have received great attention for wide application from use in small electronic devices to large-scale use such as that in hybrid electric automobiles, electric automobiles, and stationary power sources for power storage. Among them, a lithium ion secondary battery using an inorganic solid electrolyte is anticipated as a safe battery since there is no concern for liquid leakage of an organic electrolytic solution or gas generation. In addition, as compared to batteries using liquid electrolyte, the lithium battery using the solid electrolyte has a low probability of side reactions other than battery reactions, and thus, long life span of the battery can be expected. Further, with an all-solid battery using an inorganic solid electrolyte, a battery can be easily configured by stacking the electrodes and electrolyte, thereby reducing manufacturing cost. At the same time, when the inorganic solid electrolyte is used, a bipolar battery configuration is also possible. Thus, a higher energy density is anticipated as compared to conventional batteries using liquid electrolyte. However, in a lithium ion battery with particularly high electromotive force, a positive electrode is a material having a high oxidizing power and a negative electrode is a material having a high reducing power. Therefore, these materials are required to be stable even if the materials and the solid electrolyte are closely adhered. Further, inexpensiveness of constituent elements become an important factor in view of practicality.

In recent years, lithium lanthanum zirconate based compounds and perovskite compounds, which have high lithium ion conductivity and can be easily obtained by a solid-state reaction in air, have received attention. A representative example of these materials includes $Li_7La_3Zr_2O_{12}$. This compound is known to exhibit a high lithium ion conductivity of $5\times10^{-4}$ S/cm or more, which is top class among oxide solid electrolytes, at room temperature.

BRIEF DESCRIPTION OF THE DRAWINGS

FIG. 2 is a schematic diagram showing a crystal structure of a rhombohedral crystal system of a NASICON compound included in another example of the solid electrolyte according to the embodiment;

FIG. 5 is a schematic cross-sectional diagram showing an example of a battery according to an embodiment;

FIG. 9 is a perspective view schematically showing an example of a battery module according to an embodiment;

DETAILED DESCRIPTION

Figure 1:
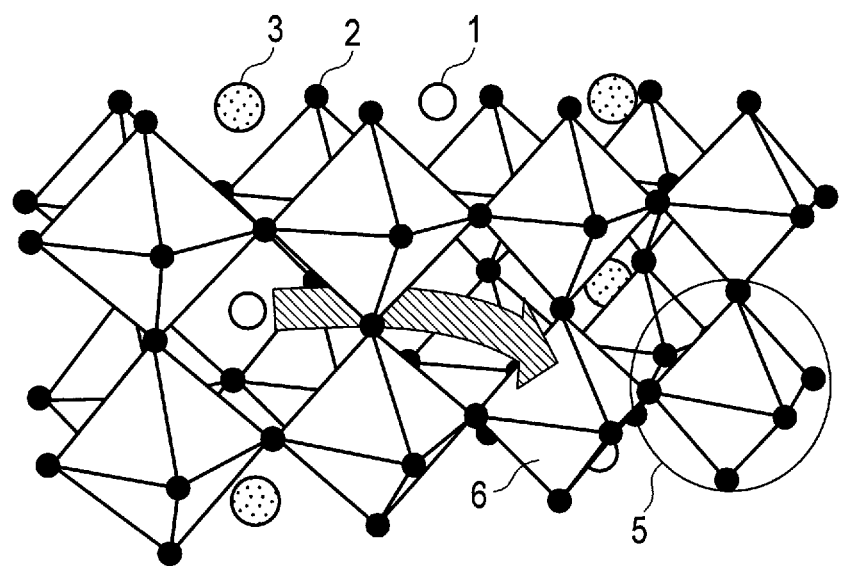
FIG. 1 is a schematic diagram showing a crystal structure of a perovskite compound included in an example of a solid electrolyte material according to an embodiment.

According to one embodiment, provided is a solid electrolyte material including an oxide, the oxide including an octahedral coordination structure that includes a metal element M and oxygen atoms arranged centering on the metal element M. The metal element M includes Nb and Ta. A mass ratio $\alpha_{Ta}/\alpha_{Nb}$ of a mass $\alpha_{Ta}$ of Ta to a mass $\alpha_{Nb}$ of Nb is within a range of $5\times10^{-5} \leq \alpha_{Ta}/\alpha_{Nb} \leq 3\times10^{-3}$.

According to another embodiment, provided is an electrode including the solid electrolyte material according to the above embodiment.

According to a further other embodiment, provided is a battery including a positive electrode layer, a negative electrode layer, and a Li conductive layer. The positive electrode layer is capable of having lithium ions inserted and extracted. The negative electrode layer is capable of having lithium ions inserted and extracted. The Li conductive layer is capable of conducting lithium ions. At least one of the positive electrode layer, the negative electrode layer, and the Li conductive layer includes the solid electrolyte material according to the above embodiment.

According to still another embodiment, provided is a battery pack including the battery according to the above embodiment.

According to yet another embodiment, provided is a vehicle including the battery pack according to the above embodiment.

$Li_7La_3Zr_2O_{12}$ is excellent in electrochemical stability as compared with conventional solid electrolytes. On the other hand, this compound has a problem that the resistance against the reducing side over a course of time is low. A solid electrolyte in which atoms within its material have been reduced exhibits electron conductivity, and thus a function of electrically insulating the positive electrode and the negative electrode is impaired. As a result, the self-discharge of the battery may increase.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which shape, size and ratio are different from those in a device actually used, but they can be appropriately changed in design taking the following explanations and known technology into consideration.

First Embodiment

A solid electrolyte material according to a first embodiment includes an oxide including an octahedral coordination structure. The octahedral coordination structure includes a metal element M and oxygen atoms (O) arranged centering on the metal element M. The metal element M includes Nb and Ta. A mass ratio $\alpha_{Ta}/\alpha_{Nb}$ of a mass $\alpha_{Ta}$ of Ta to a mass $\alpha_{Nb}$ of Nb is within the range of $5\times10^{-5} \le \alpha_{Ta}/\alpha_{Nb} \le 3\times10^{-3}$.

The solid electrolyte material according to the embodiment includes the oxide having, as a basic framework, the octahedral coordination structure of oxygen (O) centered around the metal element M. In the oxide, having the octahedral coordination structure as the base, the stability of the oxide framework is improved by including niobium (Nb) and a miniscule amount of tantalum (Ta), as the metal element M. For this reason, it is possible to provide a solid electrolyte material which is chemically stable and exhibits high reduction resistance and excellent ion conductivity, with a more inexpensive element composition.

As the bond strength between the metal element M and the oxygen atom O becomes stronger, the reduction resistance of the oxide becomes higher. As a result, the stability of the framework of the solid electrolyte increases. On the other hand, as the bond strength between M and O becomes stronger, there is tendency for the flexibility of the framework upon Li ion conduction to be impaired, lowering the conductivity thereof at room temperature. Many solid electrolytes having a high conductivity at room temperature had a tendency of having narrow potential windows at which the solid electrolytes are stable, and when the solid electrolytes are subjected to a reductive potential for a long period, the M atoms in the framework tended to become reduced. It has been known that if a solid electrolyte includes, as the metal element M, tantalum (Ta), which is chemically stable and has strong binding property to oxygen, the flexibility of the framework is impaired. The solid electrolyte according to the embodiment includes the oxide including niobium (Nb) and miniscule amount of tantalum (Ta) as metal element $M\alpha$. By including the metal element $M\alpha$ composed of Nb and Ta in the sites of the metal element M within the crystal structure, the solid electrolyte can achieve both the electrochemical stability and the flexibility of the framework.

In a compound having, between crystal lattices, a crystal structure with spaces that may serve as a conduction path of Li ions, the flexibility of the framework structure has a great influence on the Li ion conduction. A more flexible framework structure tends to have higher Li ion conductivity. On the other hand, in order to increase the reduction resistance, it is desirable to attract electron clouds of oxide ions to the metal element M. In the solid electrolyte according to the embodiment, a mass ratio $\alpha_{Ta}/\alpha_{Nb}$ of a mass $\alpha_{Ta}$ of Ta to a mass $\alpha_{Nb}$ of Nb included in the oxide is within the range of $5\times10^{-5} \le \alpha_{Ta}/\alpha_{Nb} \le 3\times10^{-3}$. The mass $\alpha_{Nb}$ and mass $\alpha_{Ta}$ can be respectively expressed, for example, in ng (nanogram) units. The units of the respective masses are not particularly limited; however, with regard to the mass ratio $\alpha_{Ta}/\alpha_{Nb}$, the respective units are matched with one another. When the metal element M includes the metal element $M\alpha$ composed of Nb and Ta, and the mass ratio $\alpha_{Ta}/\alpha_{Nb}$ is within the range of $5\times10^{-5} \le \alpha_{Ta}/\alpha_{Nb} \le 3\times10^{-3}$, it is possible to obtain a framework structure exhibiting high flexibility and simultaneously obtain excellent reduction resistance.

By including an appropriate amount of Nb, the bonds with high flexibility between Nb and oxide ions becomes dominant within the framework. On the other hand, due to a slight amount of Ta being dispersed among Nb sites (sites of the metal element M), localized binding property between Ta and oxide ions is increased. Thereby, electron clouds of oxide ions become attracted, and thus the reduction resistance can be enhanced. If the mass ratio $\alpha_{Ta}/\alpha_{Nb}$ between Nb and Ta is $3\times10^{-3}$ or less, the framework structure can have flexibility, and thus, Li ions can easily move within spaces among the lattice. If the mass ratio is $5\times10^{-5}$ or more, strong covalent bonds between Ta and oxide ions are included in a large amount, and thus, an oxide which is hardly reduced can be obtained. By including Nb and Ta at a mass ratio $\alpha_{Ta}/\alpha_{Nb}$ within the range described above, it is possible to obtain an oxide which is well-balanced between the flexibility of the crystal lattices and the reduction resistance.

Ta that is included in a minute amount as the metal element $M\alpha$ is included as a central metal in the octahedral coordination structure. Ta is not merely included as a compound which is mixed together with the oxide including an octahedral coordination structure including Nb as a center or as a compound covering the oxide. In other words, the oxide included in the solid electrolyte material according to the embodiment differs from a simple mixture between a niobium oxide and a tantalum oxide. This oxide can be said to be a composite compound in which Nb and Ta equivalently occupy the sites of the metal element M.

It is desirable that the valences of both Nb and Ta included as the metal element $M\alpha$ in the oxide be not less than 5. That is, in a desirable solid electrolyte material, the valence of Nb is 5.0, and simultaneously, the valence of Ta is 5.0. It should be noted that the solid electrolyte hardly reaches an overly oxidized state, and neither of the valences of Nb and Ta are unlikely to exceed 5. When the valence of Nb is 5.0, and at the same time, the valence of Ta is 5.0, it is possible for the flexibility of the crystal lattices and the reduction resistance to be well-balanced, and also provide a battery having little self-discharge by blocking the electron conduction in the solid electrolyte.

The metal element M, which is a central atom in the octahedral coordination structure, preferably further includes, in addition to the metal element $M\alpha$ (Nb and Ta), at least one metal element $M\beta$ selected from the group consisting of Ti, Zr, Ga, Ge, Si, Fe, and P. These elements $M\beta$ can improve the stability of the structure of the oxide. Among these metal elements $M\beta$, Ti, Zr, Ga, and Ge can play a role as a central atom in the octahedral coordination structure, similarly to the metal element $M\alpha$. Here, the at least one selected from Ti, Zr, Ga, and Ge is referred to as a primary element $M\beta_p$.

Among the metal elements $M\beta$, the other metal elements, i.e., Si, Fe, and P, hardly function as a central atom. Here, the at least one selected from the group consisting of Si, Fe, and P is referred to as a supplementary element $M\beta_s$. These supplementary elements $M\beta_s$ have a valence smaller than that of $M\alpha$ structuring the framework of the oxide and enable improvements in the flexibility and the stability of the framework.

An element ratio $E\beta_s/E_{Nb}$ of an element abundance ratio $E\beta_s$ of the supplementary element $M\beta_s$ to an element abundance ratio $E_{Nb}$ of Nb included in the oxide is preferably $1\times10^{-4}$ or more and $5\times10^{-3}$ or less, and more preferably $5\times10^{-4}$ or more and $1\times10^{-3}$ or less. If the ratio is $1\times10^{-4}$ or more, the flexibility of the framework is further improved, leading to an increase in the conductivity. Furthermore, the element ratio $E\beta_s/E_{Nb}$ of the supplementary element $M\beta_s$ to Nb is preferably $5\times10^{-3}$ or less. If the element ratio is more than $5\times10^{-3}$, local distortion in the structure increases, and thus, the stability of the crystal structure may rather degrade. It is more preferable that the ratio is $5\times10^{-4}$ or more and $1\times10^{-3}$ or less, since then, both an improvement in ion conductivity and the stability of the crystal structure are easily achieved.

The crystal structure of the oxide included in the solid electrolyte material includes at least one selected from the group consisting of a perovskite structure and a NASICON structure.

The solid electrolyte according to the embodiment may include, for example, as an oxide, a compound having a perovskite structure represented by $AMO_3$. The crystal structure of perovskite type belongs to a cubic crystal system, or a similar crystal system which is slightly distorted from the cubic crystal system. A typical space group of this crystal structure is Pm3m.

An example of a perovskite structure is explained with reference to FIG. 1. FIG. 1 is a schematic diagram showing a crystal structure of a perovskite compound included in an example of a solid electrolyte material according to the embodiment.

The perovskite structure has a three-dimensional framework which is formed by sharing of vertices among $MO_6$ octahedrons 5, and has a structure where A-site ions 3 occupy 12-coordination sites amongst the three-dimensional framework. Each of the $MO_6$ octahedrons 5 includes oxygen atoms 2 and an M atom (not shown). The oxygen atoms 2 corresponding to vertices of the $MO_6$ octahedron 5 are arranged around the metal element M positioned at the center of each octahedral site 6.

In a case where the A-site is not entirely filled with the elements and vacancies (defective structures) are present, there is formed a conductive path which is a path for Li ions 1. It is considered that lithium ion conductivity is achieved by migration of Li ions 1 to adjacent vacant A-sites through a bottleneck having an oxide ion quadrangle form that is present within a plane of the cubic lattice. In the case where Li ions 1 migrate within the crystal lattices by this conductive mechanism, a bond strength between the oxide ions and cations (mainly M-site cations) forming the framework has great influence on the lithium ionic conductivity. Therefore, for the same reason as that described above, by adjusting the mass ratio $\alpha_{Ta}/\alpha_{Nb}$ in the range described above, it is possible to improve the reduction resistance while maintaining the flexibility of the framework. Furthermore, by having Nb and Ta, serving as metal elements $M\alpha$, coexist in the M atom sites, the local distortion in the crystal lattice can be suppressed.

Preferably, the A-site further contains at least one selected from the group consisting of La, Sr, Mg, Na, K, and Ca in addition to Li and the vacancies. Thereby, the stability of the perovskite structure can be made higher.

The compound having a perovskite structure may include a compound represented by general formula $A(M\alpha_{1-w}M\beta_w)O_3$, for example. Here, a subscript w in the general formula is within the range of $0\leq w<1$. The symbol A in the formula represents an element or vacancy occupying A-sites. The A-sites include at least Li and holes. The A-sites may further include at least one selected from the group consisting of La, Sr, Mg, Na, K, and Ca. The $M\alpha$ and $M\beta$ in the formula denote the metal elements $M\alpha$ (i.e., Nb and Ta) and the metal elements $M\beta$ (primary element $M\beta_p$ and/or supplementary element $M\beta_s$), respectively explained above.

Alternatively, the solid electrolyte material according to the embodiment may include a compound having a NASICON crystal structure as the oxide. The compound having a crystal structure of NASICON type has, for example, a structure having phosphoric acid $(PO_4)$ as a framework structure. An example of such a structure includes a crystal structure belonging to a rhombohedral structure, and a representative space group is R-3c. In the rhombohedral structure, a framework structure represented by Chemical Formula $[M_2(PO_4)_3]^{n-}$ is formed, wherein $PO_4$ tetrahedrons and $MO_6$ octahedrons share all vertices amongst each other.

An example of a NASICON structure is explained with reference to FIG. 2. FIG. 2 is a schematic diagram showing the crystal structure of rhombohedral crystal system of the NASICON compound included in the other example of the solid electrolyte material according to the embodiment. In the framework structure of the rhombohedral crystal system shown in FIG. 2, there are four octahedrons around one tetrahedron and six tetrahedrons around one octahedron. General NASICON compounds are known to have the rhombohedral crystal system structure shown in FIG. 2 only at a high temperature, and that distortion (phase transition) in the framework structure occurs at a low temperature, resulting in a decrease in symmetry, thereby yielding a monoclinic crystal system (space group C2/c).

As shown in FIG. 2, the Li ions 1 exist in spaces amongst the lattice in a manner of compensating for a negative charge of the framework structure. There are four types of sites in which the Li ions are able to occupy. The first is a largely distorted octahedral site 6, one of which is present per stoichiometric chemical formula. In addition, there are sites surrounded by eight oxygen atoms 2, three of which are present per stoichiometric chemical formula. Further, there are sites occupied by an atom 4 of the metal element M, two of which are present per stoichiometric chemical formula. Finally, there is a tetrahedral site 7 interposed between two $PO_6$s, one of which is present per stoichiometric chemical formula. Since the sites occupied by Li ions are widely distributed within the crystal lattice, in this manner, a conductive path for Li ions is easily formed in the crystal structure.

For such a structure, too, Li ion conductivity is improved when flexibility of the framework structure is increased, while on the other hand, reduction resistance is improved by attracting electron clouds to the metal element M. Therefore, when the sites of the atoms 4 of the metal element M includes the metal element $M\alpha$ (Nb and Ta), and the mass ratio $\alpha_{Ta}/\alpha_{Nb}$ satisfies the range described above, it is possible to improve the reduction resistance while maintaining the flexibility of the framework.

By arranging the metal element $M\beta$ in the sites of the metal element M, in addition to the metal element $M\alpha$, it is possible to suppress distortion of the NASICON structure.

Further, it is preferable to substitute a part of the metal element M with at least one selected from the group consisting of Ca, Sr, and Ba. Here, the Ca, Sr, and Ba are referred to as D elements, for convenience. By substituting these D elements having a large ion radius into the framework structure including Nb and Ta, there can be obtained an element composition suitable for configuring a path that facilitates conduction of the lithium ions. Substitution with Ba and Sr having ion radii larger than that of Ca is more preferable. When adopting such a configuration, distortion of the framework structure at a low temperature is less apt to occur, and thus, the rhombohedral structure referred to as a high-temperature phase of NASICON type structure can be kept stable down to a low temperature below room temperature. Further, with the configuration, the Li ions are able to easily move in a temperature range lower than room temperature. Since a framework size can be enlarged by substituting D elements into the lattice, it becomes difficult for the Li ions to have electronic correlation with oxide ions. Thereby, the Li ions become able to move easily, even in a low temperature region at which heat oscillation, which is important for movement of the Li ions, is weakened.

On the other hand, even in a compound having a monoclinic structure considered as having much distortions of the crystal structure, the framework size can be enlarged by substitution of D elements into the lattice. Therefore, for the compound having the monoclinic structure, as well, introduction of D elements make Li ions become able to move easily even in a temperature region lower than room temperature, in the same manner as in high temperature phase.

The distribution of Ta may be uniform across all the sites of the metal element M in the crystal structure, or there may be a bias in the distribution. It is desired that there is a certain degree of uneven distribution in the arrangement of Ta, rather than Ta being randomly arranged within the crystal structure. The "uneven distribution" referred to herein denotes that an average bond distance between Ta and Ta (average Ta—Ta bond distance) in the crystal structure is smaller than an average bond distance between Nb and Ta (average Nb—Ta bond distance).

The compound having a NASICON structure may include a compound represented by, for example, a General Formula, $Li_xM\alpha_y(M\beta_{1-z}D_z)(PO_4)_3$. Here, subscript x in the general formula is within the range of $0<x\leq2$, subscript y is within the range of $0<y\leq1$, and subscript z is within the range of $0\leq z\leq1$. $M\alpha$ and the $M\beta$ in the formula represent the metal element $M\alpha$ and the metal element $M\beta$ respectively explained above. "D" in the formula is at least one selected from the group consisting of Ca, Sr, and Ba. The NASICON structure, which the compound has, includes at least one selected from the group consisting of a rhombohedral structure and a monoclinic structure.

<Production Method of Oxide>

An example of a method for synthesizing the oxide included in the solid electrolyte material according to the first embodiment includes a solid-state reaction method. As raw materials for the solid-state reaction, oxides of constituent elements or various salt compounds such as carbonates, nitrates, and the like, that generate the constituent elements when heated, may be used. Various raw materials are mixed at a predetermined ratio so as to correspond to a target composition. By firing the mixture, the oxide that includes the octahedral coordination structure including metal elements M and oxygen atoms can be obtained.

Various raw materials are mixed at a predetermined ratio so as to correspond to a target composition represented by the above-mentioned General Formula A $(M\alpha_{1-w}M\beta_w)O_3$, for example. A compound having a perovskite structure can be obtained by firing this mixture. Alternatively, various raw materials are mixed at a predetermined ratio so as to correspond to the target composition represented by the above-mentioned General Formula, $Li_xM\alpha_y(M\beta_{1-z}D_z)(PO_4)_3$, for example. A compound having a NASICON structure can be obtained by firing the mixture.

Preferable as phosphagen used for synthesizing the oxide of NASICON structure is, for example, phosphates such as ammonium dihydrogen phosphate ($NH_4H_2PO_4$). As the phosphagen, a single phosphate may be used, or two species or more may be used in combination. Oxides are preferably used as raw materials as sources of metal elements M. A single oxide as raw materials for metal elements M may be used, or two species or more may be used in combination. Metal salts such as chlorides, carbonates, nitrates, and the like are preferably used as raw materials as sources of elements that may be included in the A-sites of the perovskite structure and D elements that may be included in the NASICON structure. A single raw material may be used, or two species or more may be used in combination.

First, as described above, these raw materials are mixed to have a ratio corresponding to the target composition to obtain a mixture. The mixture is first subjected to a low-temperature heating treatment.

Here, if a compound having a NASICON structure is to be obtained, a pre-heating treatment is desirably performed. Since the raw materials of the compound of the NASICON structure include phosphate, if the compound is synthesized by a generally known solid-state reaction method, melting reaction is violent, such that evaporation of light elements occurs. Accordingly, when a general synthesis method is employed, generation of an impurity phase or composition deviation occurs. The mixture is subjected to the low-temperature heat treatment in which the mixture is heated under a temperature condition of 150° C. to 350° C., for example, for 12 hours, and then taken out of a heating furnace, followed by rapid cooling, thereby promoting decomposition of the phosphate at the beginning to suppress the melting reaction between the phosphate and other raw materials. A temperature which is 100° C. or more greater than a melting point of the phosphate used (more than about 350° C.) is not preferable, since at this temperature, the melting reaction between the phosphate and other raw materials occurs, leading to evaporation of the light elements. In addition, at a temperature lower than the melting point of the phosphate used at the beginning (less than about 150° C.), the phosphate is not sufficiently decomposed, and thus, it is difficult to obtain the effect of decomposing the phosphate.

The mixture subjected to the low-temperature heat treatment may be re-pulverized and pre-fired at 600° C. to 800° C., whereby a uniform mixing state can be obtained by heat diffusion. When the pre-firing temperature is less than 600° C., it is difficult to obtain a sufficient mixing state. On the other hand, if the pre-firing temperature is more than 800° C., sintering proceeds, making it difficult to obtain the uniform mixing state. Time for pre-firing is preferably about 5 hours to 20 hours.

When phosphate is not used as raw material(s) as in the synthesis of the compound having a perovskite structure, the above-mentioned pre-heating treatment (low-temperature heating treatment) can be omitted. After obtaining a mixture of the raw materials, the mixture can be directly pre-fired.

The raw material mixture after performing the pre-firing in such a manner is pulverized and mixed, and then, is fired at 1000° C. to 1400° C. in air or under a flow of oxygen gas or nitrogen gas, and the like. Here, in order to obtain a single phase of the target crystal structure, it is preferred to perform the firing divided into several times by repeatedly performing the firing and re-pulverization. A method for pulverization is not particularly limited.

It is desired that after performing the synthesizing firing described above, the resulting mixture be, subjected to an annealing treatment under an oxygen atmosphere. Specifically, the resulting mixture is annealed as follows. For example, a sample is placed in a tubular furnace, and the inside of the furnace is filled with pure oxygen gas. Subsequently, the sample is subjected to an annealing treatment at 600° C. for 12 hours, while performing a pure oxygen flow at 0.5 L/min. By performing the annealing treatment, it is possible to obtain an oxide in which the valence of Nb is 5.0, and the valence of Ta is 5.0.

Further, it is possible to configure an all solid battery by using positive electrode materials and negative electrode materials that include the solid electrode electrolyte material according to the embodiment, at the time of firing. Here, powders of materials are piled so as to have a configuration in which a layer of the solid electrolyte material is stacked between the positive electrode layer and the negative electrode layer in the all solid battery to be obtained. Then, the stack is solidified by press molding and the like, and fired, thereby obtaining an all solid battery in which an interfacial grain boundary is small. When a firing temperature is lower than 1000° C., reactivity is poor, and therefore not only is a long time required for firing, but it is difficult to obtain a desired phase. When the firing temperature is higher than 1400° C., evaporation of alkali metals including lithium or alkaline earth metals is increased, such that the resulting composition is apt to become deviated from the target composition. The sum of firing time varies depending on firing temperature, but is generally 1 hour to 5 hours. In particular, the firing is preferably performed at a temperature condition of 1300° C. for about 2 hours to 3 hours. In addition, as firing atmosphere, air is preferred in view of cost and convenience. Further, in order to prevent the compositional deviation due to lithium evaporation during the firing, it is preferred to estimate an evaporation amount in advance and mix the lithium source in excess.

<Measurement of Solid Electrolyte Material>

Hereinafter, a method of measuring a solid electrolyte material will be described. Specifically, a powder X-ray diffraction measurement, an analysis by an electron probe microanalysis method, a transmission electron microscope-energy-dispersive X-ray spectrometry measurement, and an inductively-coupled plasma emission spectrometry analysis will be described.

(Powder X-Ray Diffraction Measurement)

The crystal structure of an oxide included in the solid electrolyte material can be examined by a powder X-ray diffraction measurement.

When a target solid electrolyte material to be measured is included in a battery, for example, the measurement sample is taken out of the battery by a method described as follows.

In, for example, an all-solid battery including a later described electrode body having a structure constructed by stacking a positive electrode layer, a negative electrode layer, and an electrolyte layer, the solid electrolyte material may be included in the electrolyte layer. First, the battery is brought into a completely discharged state. For example, the battery can be put into the discharged state by discharging the battery in a 25° C. environment at 0.1 C current to a rated end voltage. The electrode body is taken out from the battery. The electrolyte layer can be extracted by scraping off the positive electrode layer and the negative electrode layer by polishing the electrode body taken out from the battery. The extracted electrolyte layer is pulverized until an average particle diameter is about 10 μm. The average particle diameter may be determined by laser diffraction. The pulverized sample is filled in a flat plate holder section having a depth of 0.2 mm formed on a glass sample plate. At this time, care should be taken to sufficiently fill the holder section with the sample. Precaution should also be taken to avoid cracking and gaps caused by insufficient filling of the sample. Then, another glass plate is used to smoothen the surface of the sample by sufficiently pressing the glass plate against the sample. Upon which, precaution should be taken to avoid too much or too little a filling amount, so as to prevent any rises and dents beyond the reference plane of the glass holder. Subsequently, the glass plate filled with the sample is set in a powder X-ray diffractometer, and X-ray diffraction (XRD) patterns are obtained using Cu-Kα rays.

Note that, in the case where there is high degree of orientation in the sample, there is possibility of deviation of peak positions or variation in intensity ratios depending on how the sample is filled. In the case of such a sample having high orientation, measurement is performed with the sample inserted into a capillary, which is then mounted on a rotary sample table and measured while being rotated. By such a measuring method, XRD patterns of the sample can be obtained with the influence of orientation reduced. When an intensity ratio measured by this method is different from an intensity ratio measured using the flat plate holder described above, the influence due to the orientation is considerable, such that measurement results using the rotary sample table are adopted.

In addition, when this method is used for the measurement, it is possible to exclude differences in the measurement result depending on operators, and thus improve reproducibility. From the obtained diffraction patterns, lattice constants can be refined by Rietveld analysis, and the like.

As described later, the solid electrolyte material may be included in a battery as a composite electrolyte in which the solid electrolyte material and a polymer electrolyte are mixed. In the case of the battery including such a composite electrolyte, the surface of the electrode body taken out from the battery may be washed with a solvent such as ethyl methyl carbonate, for example, to expose the surface to which the solid electrolyte is applied. Measurement is performed with the surface onto which the inorganic solid particles are applied set to be at the same height as a surface of the glass holder for XRD. Here, peaks belonging to the active material (positive electrode active material or negative electrode active material) included in the sample are identified in advance. The peaks of these active materials are separated from the spectrum after the measurement, and various analyses are performed. For the separation of the peaks, multiple phase analysis using the Rietveld method is preferred.

(Electron Probe Microanalysis)

Each of the valences of Nb and Ta in the oxide can be determined by performing an analysis through a method using an Electron Probe Micro Analyzer (SPMA). As a measurement device, JXA 8900 manufactured by JEOL, can be used. The target sample is irradiated with an electron beam under the conditions of beam energy of 15 kV, a beam current 100 nA, and a beam diameter of 10 μm, and Lα-beams of Nb and Ta are measured using analyzing crystals. The valences of the measured elements are respectively determined based on respective peak shifts. An average value for each of the valences of Nb and the valences of Ta in a crystal structure of the oxide can be determined in this manner. The whole of the crystal structure need not necessarily be measured, and an average of Nb valances and an average of Ta valences can also be respectively determined by partial examination of the crystal structure.

(Transmission Electron Microscopy-Energy-Dispersive X-Ray Spectrometry)

A distribution of Ta in a crystal structure of the solid electrolyte material can be examined by a measurement through transmission electron microscopy-energy dispersive x-ray spectroscopy (TEM-EDX). A target sample including a solid electrolyte material is subjected to a TEM-EDX measurement to identify a crystal structure of each particle in the sample by a selected area diffraction method. For example, when an electrode including the solid electrolyte material is used for a measurement sample, an electrode active material may be included in the sample, besides the solid electrolyte material. The solid electrolyte and the electrode active material can be distinguished from each other by identifying the crystal structures thereof. A distribution of Ta can be determined by obtaining a mapping of Ta by EDX.

Distributions of the other elements in the crystal structure, such as Nb and the metal element Mβ, can also be determined by obtaining mappings.

(Inductively-Coupled Plasma Emission Spectrometry)

If it has been confirmed from the results of respective mappings by the TEM-EDX that target elements are included in the crystal structure, a quantitative analysis can be performed by high frequency inductively-coupled plasma (ICP) emission spectroscopy. The mass ratio $\alpha_{Ta}/\alpha_{Nb}$, the element ratio $E_{\beta s}/E_{Nb}$ of the supplementary element $M\beta_s$ to Nb, and the like can be calculated through quantitative analysis.

Here, the abundance ratio (molar ratio) of respective elements depends on the sensitivity of an analyzer used. Therefore, for example, when a composition of an oxide included in an example of a solid electrolyte material according to the first embodiment is analyzed using ICP emission spectroscopy, there may be a case where a numerical value deviates by an error of the measurement device from the molar ratio described above. However, the example of the solid electrolyte material according to the first embodiment can sufficiently exert the advantageous effects explained above, even if the measurement result deviates as described above within an error range of the analyzer.

In order to measure the composition of a solid electrolyte material incorporated into a battery by the ICP emission spectroscopy, for example, the composition can be measured by taking an active material layer out or the electrolyte layer out of the battery by using the same procedures as explained for the powder X-ray diffraction measurement, and subjecting the target to measurement. A material layer taken out is heated for a short time in air (e.g., at 500° C. for 1 hour or so) to burn away unnecessary components, such as a binder component and carbon. A liquid sample including the solid electrolyte material can be prepared by dissolving the residue by acid. At this time, hydrochloric acid, nitric acid, sulfuric acid, hydrogen fluoride, and the like may be used as the acid. The composition in the solid electrolyte material can be found by subjecting this liquid sample to ICP spectroscopy.

According to the first embodiment explained above, a solid electrolyte material, which includes an oxide including an octahedral coordination structure, is provided. The octahedral coordination structure has a structure including a metal element M and oxygen atoms arranged centering on the metal element M. The metal element M includes a metal element Mα including Nb and Ta. A mass ratio $\alpha_{Ta}/\alpha_{Nb}$ between a mass $\alpha_{Nb}$ of Nb and a mass $\alpha_{Ta}$ of Ta among the metal elements Mα is within the range of $5\times10^{-5} \leq \alpha_{Ta}/\alpha_{Nb} \leq 3\times10^{-3}$. This solid electrolyte material has high reduction resistance performance. Moreover, the solid electrolyte material allows for low costs while having chemical stability of constituent elements.

Second Embodiment

According to a second embodiment, an electrode is provided. The electrode according to the second embodiment includes the solid electrolyte material according to the first embodiment.

The electrode according to the embodiment is, for example, a battery electrode. The battery referred to herein encompasses' a storage battery capable of storing power, for example, and a specific example thereof is a secondary battery such as a lithium ion battery.

The electrode may further include an active material. The electrode may be a battery active material. Examples include an active material capable of having lithium ions inserted into and extracted from.

The electrode according to the second embodiment may include a current collector and an active material-containing layer. The active material-containing layer may be formed on one surface or both of reverse surfaces of the current collector. The active material-containing layer may contain the active material, and optionally an electro-conductive agent and a binder.

The electrode may be a positive electrode. The positive electrode may include, as a battery active material, a positive electrode active material. The positive electrode may include, as an active material-containing layer, a positive electrode active material-containing layer which contains the positive electrode active material. Explanations regarding the positive electrode active material-containing layer are omitted, since the details thereof are the same as those of a positive electrode layer described later.

The electrode may be a negative electrode. The negative electrode may include, as a battery active material, a negative electrode active material. The negative electrode may include, as an active material-containing layer, a negative electrode active material-containing layer which contains the negative electrode active material. Explanations regarding the negative electrode active material-containing layer are omitted, since the details thereof are the same as those of a negative electrode layer described later.

The electrode may have a bipolar electrode structure described later. Explanations thereof are omitted, since the explanations are the same as those described later.

The details of the current collector will be described later.

According to the second embodiment described above, an electrode including a solid electrolyte material according to the first embodiment is provided. Since ion conductivity is high and reduction resistance is excellent for the solid electrolyte material, the electrode can achieve a battery having high input-output performance and excellent storage performance.

Third Embodiment

According to a third embodiment, a battery including a positive electrode layer, a negative electrode layer, and a Li conductive layer is provided. The positive electrode layer is capable of having lithium ions being inserted and extracted. The negative electrode layer is capable of having lithium ions being inserted and extracted. The Li conductive layer is able to conduct lithium ions. At least one among the positive electrode layer, the negative electrode layer, and the Li conductive layer includes the solid electrolyte material according to the first embodiment.

The battery according to the embodiment may be, for example, a storage battery capable of storing power, for example, and a specific example thereof is a secondary battery such as a lithium ion battery.

The positive electrode layer includes a positive electrode active material, and may be disposed on a current collector to configure a positive electrode. The negative electrode layer includes a negative electrode active material, and may be disposed on a current collector to configure a negative electrode. Alternatively, the positive electrode layer may be disposed on one surface of a current collector, and the negative electrode layer may be disposed on a reverse surface of the current collector to configure an electrode having a bipolar structure. Each of the positive electrode layer and the negative electrode layer may include an electrolyte. The electrolyte that may be included in the positive electrode layer and the negative electrode layer may be the solid electrolyte material according to the first embodiment. The positive electrode active material and negative electrode active material will be described later.

The Li conductive layer may be a separator which is capable of conducting lithium ions and that is disposed, for example, between the positive electrode layer and the negative electrode layer. Alternatively, the Li conductive layer may be an electrolyte layer. The Li conductive layer as the electrolyte layer includes an electrolyte, and the electrolyte may include the solid electrolyte material according to the first embodiment.

The battery according to the embodiment includes a container member. The positive electrode, the negative electrode, and the electrolyte are housed in the container member. When a nonaqueous electrolyte is used together depending on the application, the nonaqueous electrolyte is also included in the container member. Further, a bipolar structure may be adopted as an electrode structure.

Figure 3:
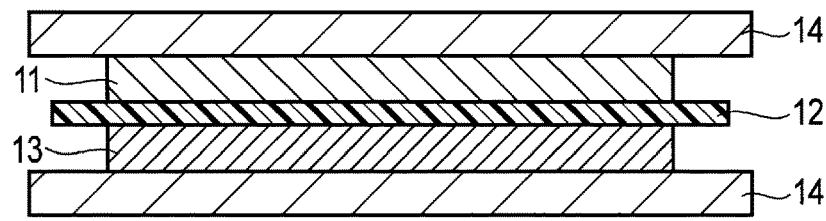
FIG. 3 is a schematic cross-sectional diagram showing an example of an electrode body according to an embodiment.

FIG. 3 shows an example of an electrode body that may be included in the battery according to the embodiment. The electrode body 10A shown in FIG. 3 includes a positive electrode layer 11, an electrolyte layer 12, a negative electrode layer 13, and current collectors 14. As shown in the drawing, the electrode body 10A has a structure in which these members are stacked such that the electrolyte layer 12 is interposed between the positive electrode layer 11 and the negative electrode layer 13, and the current collectors 14 are arranged at both ends. The electrode body 10A shown in FIG. 3 is a single stack electrode body in which one set of the above described structures is stacked.

While FIG. 3 shows an example in which the electrolyte layer 12 is included as the Li conductive layer interposed between the positive electrode layer 11 and the negative electrode layer 13, in the battery according to the embodiment, the Li conductive layer may not be the electrolyte layer 12. For example, when the positive electrode layer 11 and/or negative electrode layer 13 include the electrolyte as described below, a separator holding an electrolyte, for example, may be disposed as the Li conductive layer between the positive electrode layer 11 and the negative electrode layer 13.

Figure 4:
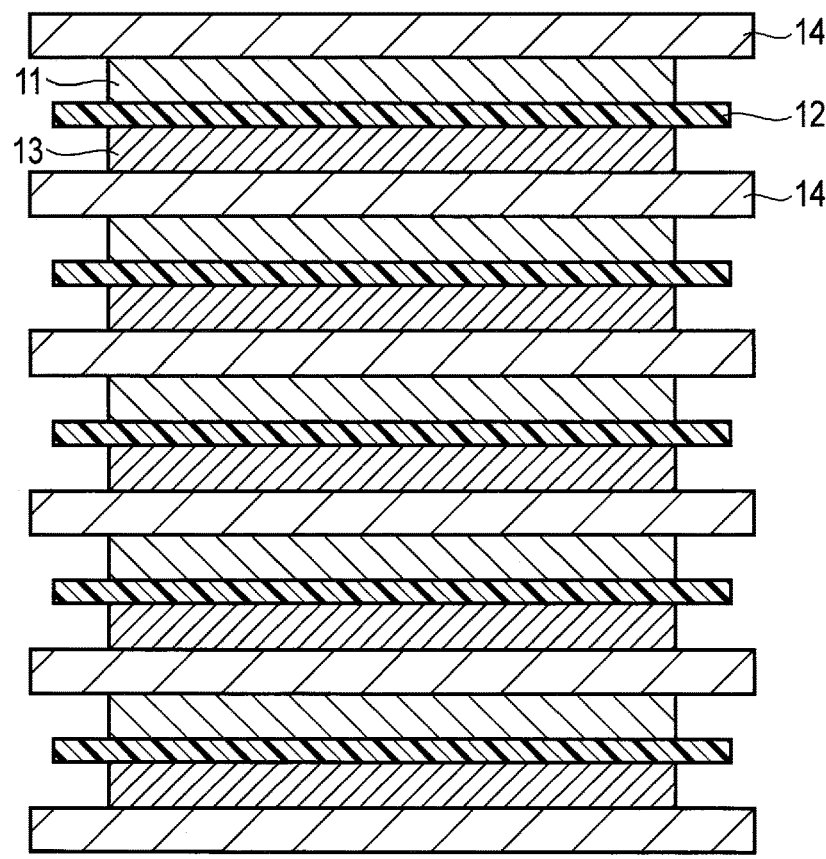
FIG. 4 is a schematic cross-sectional diagram showing an example of an electrode body having a bipolar electrode structure according to the embodiment.

As an example of another aspect of a battery according to the embodiment, an electrode body 10B having a bipolar electrode structure as shown in FIG. 4 may be configured and included in the battery. That is, two or more sets of a structure set, in which the current collector 14, the negative electrode layer 13, the electrolyte layer 12, and the positive electrode layer 11 are stacked in this order, may be stacked, and the current collector 14 may be stacked on one side of the positive electrode layer 11 at the end (top of the drawing). In other words, the electrode body 10B may include plural stacks and the current collectors 14, each of the stacks including the positive electrode layer 11, the Li conductive layer, and the negative electrode layer 13 which are sequentially stacked, and the electrode body 10B may thus have a bipolar electrode structure in which the current collectors 14 are arranged between the positive electrode layer 11 of one stack and the negative electrode layer 13 of another stack. The number of sets of stacking this structure may be appropriately selected depending on design of shape and size of the battery. In the depicted example, five sets are stacked. In the electrode body 10B according to the present embodiment, the positive electrode layer 11, the electrolyte layer 12, and the negative electrode layer 13 can be adhered snugly to be thin. Therefore, a thin battery requiring small space and having large capacity and excellent electrochemical stability can be obtained by stacking many of the stacked structures. For the electrode body 10B having the bipolar structure, too, when the positive electrode layer 11 and/or the negative electrode layer 13 includes the electrolyte, the separator including the electrolyte and the like may be disposed as the Li conductive layer between the positive electrode layer 11 and the negative electrode layer 13 instead of the electrolyte layer 12, in the same manner as the electrode body 10A of FIG. 3.

FIG. 5 is a schematic cross-sectional diagram of an example of the battery according to the embodiment.

As shown in FIG. 5, the battery 100 includes a bipolar electrode body 10C housed in a container member 101. The illustrated electrode body 10C has a structure in which there are stacked two or more sets of a structure set, in which the current collector 14, the negative electrode layer 13, the electrolyte layer 12, and the positive electrode layer 11 are stacked in this order from the bottom, and a current collector 14 is stacked on one side of the positive electrode layer 11 at the top, similar to the electrode body 10B shown in FIG. 4. A positive electrode terminal 9 is electrically connected to the current collector 14 adjacent to the positive electrode layer 11 at an end (top of the drawing). A negative electrode terminal 8 is electrically connected to the current collector 14 adjacent to the negative electrode layer 13 at another end (bottom of the drawing). The positive electrode terminal 9 and the negative electrode terminal 8 extend to the outside of the container member 101.

For the battery 100 shown FIG. 5, an example has been depicted in which the electrode body 10C includes five sets of stacked structures in which the current collector 14, the negative electrode layer 13, the electrolyte layer 12, and the positive electrode layer 11 are stacked, in the same manner as the electrode body 10B of FIG. 4. However, the number of sets of the stacked structures included in the electrode body 10C may be, for example, one set as with the electrode body 10A of FIG. 3, or may alternatively be two or more sets.

Hereinafter, the electrolyte, the positive electrode layer, the negative electrode layer, and the container member will be described in detail.

1) Electrolyte

In the battery according to the embodiment, the positive electrode layer, the negative electrode layer, and the Li conductive layer may include the electrolyte. The electrolyte that may be included for any of the layers may be the solid electrolyte material according to the first embodiment. In the battery according to the embodiment, the solid electrolyte material according to the first embodiment is included in at least one of these layers. In the battery using the solid electrolyte material, a safe battery can be provided since there is no concern for leakage of an organic electrolytic solution or gas generation.

In the layer including the solid electrolyte material described in the first embodiment, the lithium ion conductive solid electrolyte material may be used alone or may be mixed with other species of solid electrolytes (for example, other NASICON type solid electrolytes, other perovskite type solid electrolytes, garnet type solid electrolytes, LISO-CON-based solid electrolytes, and sulfide-based solid electrolytes). A battery according to a more preferred aspect includes as the electrolyte, a composite electrolyte including the solid electrolyte material according to the first embodiment and an organic electrolyte. The solid electrolyte material forms inorganic solid particles. Preferable is a state in which the composite electrolyte is formed with the inorganic solid particles and the organic electrolyte.

The organic electrolyte in the composite electrolyte includes Li (lithium) ions exhibiting ion conductivity and at least one specie selected from the group consisting of propylene carbonate (PC), ethylene carbonate (EC), diethyl carbonate (DEC), and methyl ethyl carbonate (MEC). Note, that it is not preferable to use sulfide solid electrolyte particles having high Li ion conductivity as the inorganic solid particle for forming the composite electrolyte together with the organic electrolyte, since sulfur components become dissolved.

A mass ratio of the organic electrolyte in the composite electrolyte is desirably from 0.1% to 20%. In other words, when the total amount of the composite electrolyte is 100 parts by mass, a content of the organic electrolyte is desirably from 0.1 part by mass to 20 parts by mass. A mass ratio of the organic electrolyte in the composite electrolyte is preferably from 1% to 10%, and particularly preferably, about 4%.

The composite electrolyte may further include a binder. As the binder, it is more preferred to use polymers that form a gel with carbonates, examples of such a polymer including polyacrylonitrile (PAN), polyethylene oxide (PEO), polyvinylidene fluoride (PVdF), poly methyl methacrylate, and the like. A content of the binder is preferably less than 20% by mass based on the total mass of the composite electrolyte, for example, in the case of PVdF.

The composite electrolyte is preferably a solid polymer electrolyte or a gel polymer electrolyte. Whether the composite electrolyte is of a solid phase or a gel phase may be appropriately adjusted by selection of composition of the organic electrolyte and the binder. When the composite electrolyte is a solid polymer electrolyte, it is generally possible to achieve a compact battery device. If the composite electrolyte is a gel polymer electrolyte, it is easy to perform manipulations such as manufacture of the battery device or modification of a shape, and the like.

According to the composite electrolyte according to the embodiment, ion conductivity can be increased by obtaining a composite between the solid electrolyte material according to the first embodiment and the organic electrolyte. This is because mobile Li ion concentration is increased at the interface between the Li ion conductive inorganic solid particles and the organic electrolyte, thereby facilitating the movement of the Li ions. In addition, when a Li-containing oxide solid electrolyte having a high Li ion conductivity is used as the organic electrolyte, the movement of Li ions is better facilitated.

Further, by using the above-described organic electrolyte and the inorganic solid particles (particles of the solid electrolyte material according to the first embodiment), the inorganic solid particles become chemically stable with respect to the organic electrolyte, and therefore, problems such as dissolution of the inorganic solid particles does not occur. Moreover, by virtue of using the Li ion conductive inorganic solid particles, even at a high temperature, it is difficult for a reduction reaction that accompany Li movement to occur, and thus, stability and lifespan of the composite electrolyte can be increased.

Figure 6:
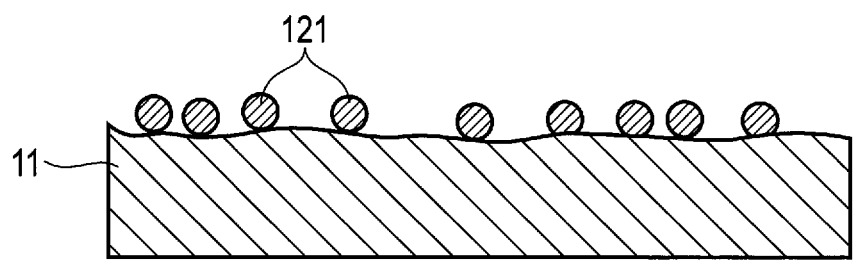
FIG. 6 is a schematic diagram showing one process in a method for manufacturing the electrode body according to the embodiment.
Figure 7:
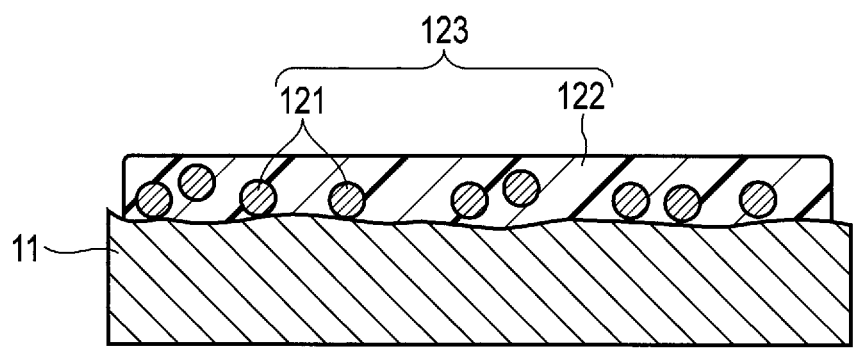
FIG. 7 is a schematic diagram showing a subsequent process to the process in the manufacturing method shown in FIG. 6.
Figure 8:
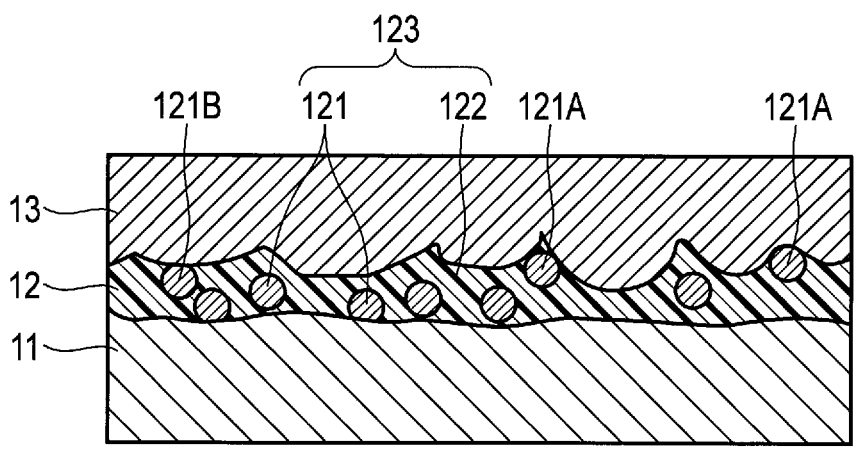
FIG. 8 is a schematic diagram showing an electrode body manufactured by the manufacturing method shown in FIG. 7.

Surfaces of the positive electrode layer 11 and the negative electrode layer 13 may not be flat, and may have irregularities as shown in FIGS. 6 to 8. In the battery according to the embodiment, for example, when the electrolyte layer 12 is configured using a composite electrolyte 123 including the inorganic solid particles 121 and the organic electrolyte 122 as shown in FIG. 7, interfaces between the electrolyte layer 12 and the positive electrode layer 11 and between the electrolyte layer 12 and the negative electrode layer 13 may be formed along the irregularities (depressions and protrusions) on the surfaces of the positive electrode layer 11 and the negative electrode layer 13. An example is shown in FIG. 8. The inorganic solid particles 121 may include particles of the above-described solid electrolyte (the solid electrolyte material according to the first embodiment, and other solid electrolytes). As shown in FIGS. 6 to 8, the surfaces of the positive electrode layer 11 and the negative electrode layer 13 have the irregularities due to the materials (such as particles of active materials to be described below) configuring each electrode. In particular, in a case where secondary particles with an average secondary particle diameter of larger than 5 μm are used as negative electrode active material particles as described below, the surface of the negative electrode layer 13 has large depressions and protrusions. The electrolyte layer 12 is adhered snugly to the positive electrode layer 11 and the negative electrode layer 13 along these irregularities (depressions and protrusions). Specifically, since the organic electrolyte 122 is of a gel phase or has fluidity before curing during a preparation process described below, the organic electrolyte 122 permeates into a concave section formed by the particles on the surfaces of the positive electrode layer 11 and the negative electrode layer 13.

According to the structure, the surface of the electrolyte layer 12 is formed such that the surfaces of the electrolyte layer 12, and the positive electrode layer 11 and the negative electrode layer 13 are adhered snugly to each other along the irregularities on the surfaces of the positive electrode layer 11 and the negative electrode layer 13, such that there are nearly no space between the electrolyte layer 12 and the positive electrode layer 11, and between the electrolyte layer 12 and the negative electrode layer 13. In particular, as shown in FIG. 8, when the inorganic solid particles 121A, which are a part of the inorganic solid particles 121, are included deeply in the concave sections of the negative electrode layer 13, conductivity is excellently provided through the inorganic solid particles 121A on the surface including the concave sections of the negative electrode layer 13. In addition, when the electrolyte layer 12 includes, for example, the inorganic solid particles 121B which are hard particles as the solid electrolyte particles, the hard inorganic solid particles 121B impart structural strength to the electrolyte layer 12, thereby securing some extent of thickness in the electrolyte layer 12. Thus, short-circuiting due to the positive electrode layer 11 and the negative electrode layer 13 becoming directly and tightly in contact with each other can be prevented.

Alternatively, the composite electrolyte may be included in the positive electrode layer 11, for example, in a state in which the composite electrolyte covers at least a part of the particles of the positive electrode active material. That is, when the electrolyte is included in the positive electrode layer 11, the above-described composite electrolyte may cover the positive electrode active material particles individually. In a similar manner, the composite electrolyte may be included in the negative electrode layer 13, for example, in a state in which the composite electrolyte covers at least a part of the particles of the negative electrode active material. That is, when the electrolyte is included in the negative electrode layer 13, the above-described composite electrolyte may cover the negative electrode active material particles individually. A positive electrode layer 11 and negative electrode layer 13 in such a state can be considered as a polymeric material layer.

When the electrolyte layer 12 is used in the battery according to the embodiment, for example, the electrolyte layer 12 may be produced by applying the organic electrolyte for configuring the composite electrolyte onto the positive electrode layer 11 or the negative electrode layer 13, or by injecting the organic electrolyte between the positive electrode layer 11 and the negative electrode layer 13 arranged parallel to each other.

As a more specific example, the electrolyte layer 12 may be produced, for example, by the following production method. In this specific example, a method of producing the electrolyte layer 12 on the positive electrode layer 11 is described, but the production method of the electrolyte layer 12 according to the embodiment is not limited thereto. First, inorganic solid particles 121 are dispersed in a solution including the binder to prepare a binder dispersion solution of the solid electrolyte particles. Here, any one of the above-described species is usable for the binder. The inorganic solid particles 121 may be particles of the solid electrolyte material according to the first embodiment. Next, the binder dispersion solution is applied onto the positive electrode layer 11 to dispose the inorganic solid particles 121 onto the positive electrode layer 11 as shown in FIG. 6. Thereafter, as shown in FIG. 7, the organic electrolyte 122 may be impregnated onto the positive electrode layer 11, and heated and mixed to configure a gel composite electrolyte 123 containing the organic electrolyte 122 and the inorganic solid particles 121. Next, the positive electrode layer 11 and the negative electrode layer 13 may be arranged facing each other and pressed, thereby obtaining the electrode body in which the composite electrolyte layer 12 is interposed between the positive electrode layer 11 and the negative electrode layer 13 as shown in FIG. 8.

Here, by virtue of using the gel composite electrolyte 123 as the electrolyte layer 12, when the negative electrode layer 13 is pressed against the composite electrolyte 123 on the positive electrode layer 11, the composite electrolyte 123 enters into gaps among irregularities on the surfaces of the positive electrode layer 11 and the negative electrode layer 13 or permeates into the irregularities, in particular, the irregularities of the active material that may be present on the surfaces of these electrode layers. Accordingly, the positive electrode layer 11, the negative electrode layer 13, and the electrolyte layer 12 become adhered snugly along the respective irregularities.

In addition, when a solid polymer is used as the organic electrolyte, the organic electrolyte having fluidity before solidification may be applied onto the positive electrode layer 11. In the case where fluidity of the organic electrolyte is sufficiently high when applying the organic electrolyte onto the positive electrode layer 11, a spray method or the like, may be used. By using the spray method, the composite electrolyte 123 can be uniformly disposed on the positive electrode layer 11, and a thickness of the electrolyte layer 12 can be easily adjusted by adjusting an amount of the composite electrolyte 123 disposed.

In addition, when the electrolyte layer 12 is produced by injecting the organic electrolyte 122 between the positive electrode layer 11 and the negative electrode layer 13, specifically, for example, the electrolyte layer 12 may be prepared by a method in which the positive electrode layer 11 and the negative electrode layer 13, having the inorganic solid particles 121 arranged thereon, are arranged with a predetermined distance (a value set as the thickness of the electrolyte layer 12) therebetween, and then, the organic electrolyte 122 is injected and permeated.

In the present aspect, the organic electrolyte 122 and the inorganic solid particles 121 are embedded into fine concave section of the positive electrode layer 11 and negative electrode layer 13, and thus, the electrolyte layer 12, positive electrode layer 11, and negative electrode layer 13 are snugly adhered without gaps. Since the interfaces between the electrolyte layer 12 and positive electrode layer 11 and between the electrolyte layer 12 and negative electrode layer 13 are favorably formed, the ion conductivity through the electrolyte layer 12 is improved. The positive electrode layer 11 and the negative electrode layer 13 are snugly adhered to the electrolyte layer 12, and therefore, the thickness of the electrolyte layer 12 can be made to be the small range described above 2) Positive Electrode Layer The positive electrode layer 11 is supported on one side of the current collector 14, in the example of the single stack electrode body 10A shown in FIG. 3. The positive electrode layer 11 includes an active material (positive electrode active material), an electro-conductive agent, and a binder. Further, the positive electrode layer 11 may include an electrolyte. This electrolyte may be the above-described solid electrolyte (the solid electrolyte material according to the first embodiment, and other solid electrolytes). In addition, an aspect in which the positive electrode layer 11 includes a nonaqueous electrolyte as the electrolyte is also possible. The nonaqueous electrolyte referred to herein includes, for example, a liquid nonaqueous electrolyte or a gel electrolyte based on the nonaqueous electrolyte.

As the current collector 14 for supporting the positive electrode layer 11 on a surface thereof, a foil including aluminum (Al) is preferably used. As such an Al-containing foil, it is preferred to use an aluminum foil of pure Al (purity of 100%) or an aluminum alloy foil in which an aluminum purity is 99% or more and less than 100%. As the Al alloy, an alloy including at least one selected from the group consisting of Fe, Mg, Zn, Mn, and Si in addition to Al is preferred. For example, an Al—Fe alloy, an Al—Mn-based alloy, and an Al—Mg-based alloy are able to obtain higher strength than that of Al. On the other hand, a content of transition metals such as Cu, Ni, Cr, and the like in the Al and Al alloys is preferably 100 ppm or less (including 0 ppm). For example, an Al—Cu-based alloy has increased strength, but deteriorated corrosion resistance, and thus, the Al—Cu-based alloy is not suitable as the current collector 14.

A more preferable Al purity used for the current collector 14 on which the positive electrode layer 11 is supported is in a range of from 99.0% to 99.99%. Within this range, deterioration of a high-temperature cycle lifespan due to dissolution of impurity elements can be reduced.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y\leq1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these compounds for the positive electrode active material.

The electro-conductive agent is added to increase electron conductivity in the positive electrode layer 11 and to suppress contact resistance with the current collector 14. The electro-conductive agent may include, for example, vapor grown carbon fiber (VGCF), acetylene black, carbon black, graphite, and the like.

The binder for binding the active material and the electro-conductive agent may be, for example, polytetrafluoroethylene (PTFE), polyvinylidene fluoride (PVdF), fluorine-based rubber, and the like.

Regarding a mixing ratio of the positive electrode active material, the electro-conductive agent, and the binder, the positive electrode active material is preferably in a range of from 80% by mass to 95% by mass, the electro-conductive agent is preferably in a range of from 3% by mass to 18% by mass, and the binder is preferably in a range of from 2% by mass to 7% by mass. With regard to the electro-conductive agent, when a content thereof is 3% or more by mass, the above-described effect can be exhibited, and when the content is 18% or less by mass, decomposition of the nonaqueous electrolyte on the surface of the electro-conductive agent during storage under high temperature can be reduced. With regard to the binder, when a content thereof is 2% or more by mass, sufficient electrode strength can be obtained, and when the content is 7% or less by mass, insulating sections of the electrode can be reduced.

The positive electrode layer 11 may be supported on the current collector 14 by, for example, suspending the positive electrode active material, electro-conductive agent, and binder, and optionally the solid electrolyte in an appropriate solvent, applying the suspension onto the current collector 14, and drying the coated film applied on the current collector 14, followed by pressing. A pressure at the time of pressing the positive electrode is preferably in a range of from 0.15 ton/mm to 0.3 ton/mm. The pressure within this range is preferred, since with this range, adhesion property (peel strength) between the positive electrode layer and the aluminum foil positive electrode current collector is increased, while simultaneously, an elongation rate of a positive electrode current collector foil becomes 20% or less.

3) Negative Electrode Layer

The negative electrode layer 13 is supported on one side of the current collector 14, in the example of the single stack electrode body 10A shown in FIG. 3. The negative electrode layer 13 includes an active material (negative electrode active material), an electro-conductive agent, and a binder. Further, the negative electrode layer 13 may include an electrolyte. This electrolyte may be the above-described solid electrolyte (the solid electrolyte material according to the first embodiment, and other solid electrolytes). In addition, an aspect in which the negative electrode layer 13 includes a nonaqueous electrolyte as the electrolyte is also possible. The nonaqueous electrolyte referred to herein includes, for example, a liquid nonaqueous electrolyte or a gel electrolyte based on the nonaqueous electrolyte.

It is preferred to use a foil including aluminum (Al) as the current collector 14 for supporting the negative electrode layer 13 on a surface thereof. As such Al-containing foil, Al foil or Al alloy foil is preferred. In particular, it is preferred to use aluminum foil of pure Al (purity of 100%) or aluminum alloy foil in which an aluminum purity is 98% or more and less than 100%. The purity of the aluminum foil is more preferably 99.99% or more. The thickness of the Al foil and the Al alloy foil may be, for example, 20 μm or less, and more preferably 15 μm or less. As the Al alloy, an alloy including at least one species of element selected from the group consisting of Fe, Mg, Zn, Mn and Si in addition to Al is preferred. For example, an Al—Fe alloy, an Al—Mn-based alloy, and an Al—Mg-based alloy are able to obtain higher strength than that of Al. On the other hand, a content of transition metals such as Cu, Ni, Cr, and the like, in the Al and Al alloys is preferably 100 ppm or less (including 0 ppm). For example, an Al—Cu-based alloy has increased strength, but deteriorated corrosion resistance, and thus, the Al—Cu-based alloy is not suitable as the current collector 14.

A more preferable Al purity used for the current collector 14 on which the negative electrode layer 13 is supported is in a range of from 98% to 99.95%. As described later, Ti-containing oxide particles of which the secondary particle diameter is 2 μm or more may be used as the negative electrode active material particles in the embodiment, whereby a negative electrode pressing pressure can be reduced to reduce elongation of the Al foil. Accordingly, this purity range becomes appropriate. As a result, there is an advantage that electron conductivity of the Al foil current collector can be increased, and further, disintegration of the secondary particles of the later described titanium-containing oxide can be suppressed, whereby a low-resistance negative electrode layer would be obtained.

Examples of the negative electrode active material that can have Li inserted and extracted may include a carbon material, a graphite material, a Li alloy material, a metal oxide, and a metal sulfide. Of these, those containing Ti element are preferred. Among them, it is preferable to select titanium-containing oxides having a potential of where Li ions are inserted and extracted is within a range of from 1 V to 3 V (vs. Li/Li+) based on a redox potential of lithium.

Examples of titanium-containing oxides include lithium titanate having a ramsdellite structure (e.g., $Li_{2+y}Ti_3O_7$, $0\leq y\leq3$), lithium titanate having a spinel structure (e.g., $Li_{4+x}Ti_5O_{12}$, $0\leq x\leq3$), monoclinic titanium dioxide ($TiO_2$), anatase titanium dioxide, rutile titanium dioxide, a hollandite titanium composite oxide, an orthorhombic titanium composite oxide, and a monoclinic niobium-titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M (II) is at least one selected from the group consisting of Zr, Sn, V, Nb, Ta, Mo, W, Y, Fe, Co, Cr, Mn, Ni and Al. The respective subscripts in the composition formula are specified as follows: $0 \le a \le 6$, $0 \le b < 2$, $0 \le c < 6$, $0 \le d < 6$, and $-0.5 \le \sigma \le 0.5$. Specific examples of the orthorhombic titanium-containing composite oxide include $Li_{2+a}Na_2Ti_6O_{14}$ ($0 \le a \le 6$).

Examples of the monoclinic niobium titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \le x \le 5$, $0 \le y < 1$, $0 \le z < 2$, and $-0.3 \le \delta \le 0.3$. Specific examples of the monoclinic niobium titanium composite oxide include $Li_xNb_2TiO_7$ ($0 \le x \le 5$).

Another example of the monoclinic niobium titanium composite oxide is a compound represented by $Li_xTi_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: $0 \le x < 5$, $0 \le y < 1$, $0 \le z < 2$, and $-0.3 \le \delta \le 0.3$.

One species among these may be used alone, or two or more species may be mixed and used. More preferred is the spinel structured lithium-titanium oxide represented by General Formula $Li_{4+x}Ti_5O_{12}$ ($0 \le x < 3$, more preferably $-1 \le x \le 3$), for which, volume change is extremely small. By using these titanium-containing oxides, the Al foil can be used in the same manner as a positive electrode current collector in place of conventional copper foils, as a current collector for supporting the negative electrode layer. As a result, light weight and cost reduction of the battery can be realized. Further, it is advantageous in view of weight and capacity per size for the battery having the later described bipolar electrode structure.

Preferably for the particles of the negative electrode active material, an average particle diameter of primary particles is 1 μm or less, while simultaneously, a specific surface area measured according to the BET method by $N_2$ adsorption is from 3 $m^2/g$ to 200 $m^2/g$. Accordingly, when the nonaqueous electrolyte is used in the battery, affinity between the negative electrode layer 13 and the nonaqueous electrolyte can be increased. In addition, by setting the average particle diameter of the primary particle to 1 μm or less, a diffusion distance of Li ions within the active material can be shortened. Further, the specific surface area can be increased. A method for measuring the specific surface area by the BET method is described later. Further, a more preferred average particle diameter is from 0.1 μm to 0.8 μm.

A reason for setting the average particle diameter of the negative electrode active material to the above-described range is that when the specific surface area of the negative electrode layer 13 is made large from 3 $m^2/g$ to 50 $m^2/g$ by using primary particles with an average particle diameter greater than 1 μm, reduction in porosity of the negative electrode layer 13 is hardly avoided. However, when the average particle diameter is small, agglomeration of the particles easily occurs. For example, when the nonaqueous electrolyte is used, distribution of the nonaqueous electrolyte may be biased toward the negative electrode layer 13, which may cause depletion of the electrolyte in the positive electrode layer 11; a lower limit value is therefore preferably set to 0.001 μm.

The negative electrode active material particles may include secondary particles in addition to the above-described primary particles. It is preferred that the average particle size (diameter) of the secondary particles of the negative electrode active material is larger than 2 μm. It is more preferred that the secondary particle diameter of the negative electrode active material is larger than 5 μm. The most preferred secondary particle diameter is from 7 μm to 20 μm. Within this range, a high-density negative electrode can be manufactured while keeping the pressure low when pressing the negative electrode, and elongation of the Al-containing foil as the current collector can thus be suppressed.

The negative electrode active material in which the average particle diameter of the secondary particles is larger than 2 μm may be obtained, for example, as follows. First, active material raw materials are reacted to synthetically prepare an active material precursor having an average particle diameter of 1 μm or less, followed by firing treatment. The fired product is pulverized using a pulverizer such as a ball mill, a jet mill, and the like, and firing treatment is further performed, such that the active material precursor is agglomerated and grown into secondary particles having a large particle diameter.

Further, it is preferred to cover the surface of the secondary particles with a carbon material to reduce electric resistance in the negative electrode layer. The secondary particles of the negative electrode active material covered with the carbon material may be prepared, for example, by adding a precursor of the carbon material during the process for producing secondary particles, and firing at a temperature of 500° C. or higher under an inert atmosphere.

Further, the secondary particles and the primary particles of titanium-containing oxides as the negative electrode active materials may be mixed within the negative electrode layer 13. In view of higher densification, it is preferred that the primary particles are present in an amount of from 5 vol to 50 vol % within the negative electrode layer.

Next, a reason for defining the specific surface area of the negative electrode layer 13 is within the above range is described. Agglomeration is prominent with particles with a specific surface area that is less than 3 $m^2/g$. Therefore, for example, when the nonaqueous electrolyte is used, the affinity between the negative electrode layer 13 and the nonaqueous electrolyte is lowered, which increases interface resistance of the negative electrode layer 13, and as a result, output performance and charge and discharge cycle performance are deteriorated. On the other hand, when the specific surface area is more than 50 $m^2/g$, the distribution of the nonaqueous electrolyte is biased toward the negative electrode layer 13, resulting in a shortage of the nonaqueous electrolyte in the positive electrode layer 11, and thus, the output performance may not be improved. A more preferred range of the specific surface area is from 5 $m^2/g$ to 50 $m^2/g$. Here, the specific surface area of the negative electrode layer 13 means the surface area per 1 g of the negative electrode layer.

The negative electrode layer 13 may be, for example, a porous layer including the negative electrode active material, electro-conductive agent, and binder, which are supported on the current collector. When the negative electrode layer 13 is porous, it is preferred that porosity (excluding the current collector) is within a range of from 20% to 50%. Accordingly, for example, when the nonaqueous electrolyte is used in the battery, it is possible to obtain the negative electrode layer 13 having a high-density while simultaneously having excellent affinity between the negative electrode layer 13 and the nonaqueous electrolyte. A more preferable range of the porosity is from 25% to 40%.

As the electro-conductive agent, for example, a carbon material may be used. Examples of the carbon material include vapor grown carbon fiber (VGCF), acetylene black, carbon black, cokes, carbon fiber, graphite, Al powder, TiO, and the like. More preferably, a powder of the cokes, graphite, and TiO having an average particle diameter of 10 µm or less, or the carbon fiber having an average fiber diameter of 1 µm or less, in which a heat treatment temperature is from 800° C. to 2000° C., is preferred. With regard to these carbon materials, the specific surface area measured according to a BET method by $N_2$ adsorption is preferably 10 $m^2/g$ or more.

Examples of the binder include polytetrafluoroethylene (PTFE), polyvinylidene fluoride (PVdF), fluorine-based rubber, styrene butadiene rubber, core shell binder, and the like.

Regarding a mixing ratio of the active material, electro-conductive agent, and binder of the negative electrode layer 13, the negative electrode active material is preferably in a range of from 80% by mass to 95% by mass, the electro-conductive agent is preferably in a range of from 3% by mass to 18% by mass, and the binder is preferably in a range of from 2% by mass to 7% by mass.

While there is a tendency for dispersion of the particles to increase as an addition amount of the binder is greater, because the surfaces of the particles are easily covered with the binder, the specific surface area of the negative electrode layer 13 becomes reduced. On the other hand, when the addition amount of the binder is small, the particles easily agglomerate, and thus, stirring conditions (the number of revolutions of a ball mill, stirring time and stirring temperature) are desirably adjusted to suppress the agglomeration of particles. Accordingly, fine particles can be uniformly dispersed, and the negative electrode layer 13 in the embodiment can be obtained. Furthermore, even if the addition amount of the binder and the stirring conditions are within appropriate ranges, when the addition amount of the electro-conductive agent is great, the surface of the negative electrode active material is easily covered with the electro-conductive agent, and pores on the surface of the negative electrode are also decreased, and thus, the specific surface area of the negative electrode layer 13 tends to be smaller.

On the other hand, when the addition amount of the electro-conductive agent is small, the negative electrode active material is easily pulverized, and thus, the specific surface area of the negative electrode layer 13 tends to be large, and the specific surface area of the negative electrode layer 13 tends to be smaller as the dispersibility of the negative electrode active material particles is lowered. Further, not only the addition amount of the electro-conductive agent, but also the average particle diameter and specific surface area of the electro-conductive agent may affect the specific surface area of the negative electrode layer 13. Desirably, the electro-conductive agent has an average particle diameter equal to or less than the average particle diameter of the negative electrode active material, and a specific surface area larger than a specific surface area of the negative electrode active material.

The negative electrode layer 13 may be supported onto the current collector 14 by, for example, suspending the above-described negative electrode active material, electro-conductive agent, and binder, and optionally the solid electrolyte in an appropriate solvent, applying the suspension onto the current collector 14, and drying the coated film applied on the current collector 14, followed by heat-pressing. Here, it is preferred to uniformly disperse the particles of the negative electrode active material in a state where the addition amount of the binder is small.

4) Container Member

The above-described electrode bodies 10A-10C may be housed in a container as the container member 101. As the container for housing the electrode bodies 10A to 10C, a metal container or a container made of a laminate film may be used.

As the metal container, there may be used a metal can that has an angular shape or a cylindrical shape and that is made of Al, an Al alloy, iron, stainless steel, or the like. In addition, a plate thickness of the container is preferably 0.5 mm or less, and more preferably, 0.3 mm or less.

As the laminate film, for example, a multilayer film in which an Al foil is covered with a resin film, or the like, may be used. As the resin, polymers such as polypropylene (PP), polyethylene (PE), nylon, or polyethylene terephthalate (PET), and the like, may be used. In addition, a thickness of the laminate film is preferably 0.2 mm or less. The Al foil preferably has a purity of 99.5% or more.

The metal can made of the Al alloy preferably is made of an alloy having 99.8% or less of Al purity and including at least one selected from the group consisting of Mn, Mg, Zn, and Si. By using the Al alloy, strength of the metal can is drastically increased, thereby, it becomes possible to make the wall thickness of the can thin. As a result, it is possible to realize a thin, lightweight, high-output battery with excellent heat dissipation.

The above-described battery may be electrically connected in series or in parallel, and may be combined with other kinds of batteries, and/or combined with a casing or the like, to form a battery pack. The battery pack may have a configuration which is appropriately selected among conventionally known configurations. Further, a specific example of the configuration of the battery pack is described later in detail <Method for Measuring Specific Surface Area>

For measuring specific area, a method is used, where molecules of a known adsorption occupancy area is adsorbed onto a powder particle surface at a temperature of liquid nitrogen, and calculating the specific surface area of the sample from the amount. The BET method using low temperature and low humidity physical adsorption of inert gas is the most widely used method. This BET method is a method based on BET theory, which is the most famous theory as a method for calculating the specific surface area in which Langmuir theory, which is a monomolecular layer adsorption theory, is extended to multimolecular layer adsorption. The thus-obtained specific surface area is referred to as BET specific surface area.

According to the third embodiment described above, there is provided a battery including a positive electrode layer, a negative electrode layer, and a Li conductive layer. Each of the positive electrode layer, the negative electrode layer, and the Li conductive layer is capable of having lithium ions inserted into and extracted from. Among the positive electrode layer, the negative electrode layer, and the Li conductive layer, at least one includes the solid electrolyte material according to the first embodiment. The battery has high input-output performance and excellent storage performance. In addition, the battery can be provided inexpensively.

Fourth Embodiment

According to a fourth embodiment, a battery module is provided. The battery module according to the fourth embodiment includes plural of batteries according to the third embodiment.

In the battery module according to the fourth embodiment, each of the single-batteries may be arranged to be electrically connected in series or in parallel, or may be arranged in a combination of in-series connection and in-parallel connection.

An example of the battery module according to the fourth embodiment will be described next with reference to the drawings.

FIG. 9 is a perspective view schematically showing an example of the battery module according to the fourth embodiment. A battery module 200 shown in FIG. 9 includes five single-batteries 100a to 100e, four bus bars 21, a positive electrode-side lead 22, and a negative electrode-side lead 23. Each of the five single-batteries 100a to 100e is a battery according to the third embodiment.

The bus bar 21 connects, for example, a negative electrode terminal 8 of one single-battery 100a and a positive electrode terminal 9 of the single-battery 100b positioned adjacent. In such a manner, five single-batteries 100 are thus connected in series by the four bus bars 21. That is, the battery module 200 shown in FIG. 9 is a battery module of five in series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 9 of at least one battery among the five single-batteries 100a to 100e is electrically connected to the positive electrode-side lead 22 for external connection. In addition, the negative electrode terminal 8 of at least one battery among the five single-batteries 100a to 100e is electrically connected to the negative electrode-side lead 23 for external connection.

The battery module according to the fourth embodiment includes the battery according to the third embodiment. Thus, the battery module can exhibit high input-output performance and excellent storage performance.

Fifth Embodiment

According to a fifth embodiment, a battery pack is provided. The battery pack includes a battery module according to the fourth embodiment. The battery pack may include a single battery according to the third embodiment, in place of the battery module according to the fourth embodiment.

The battery pack according to the fifth embodiment may further include a protective circuit. The protective circuit has a function to control charging and discharging of the battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the battery, and/or to input external current into the battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 10:
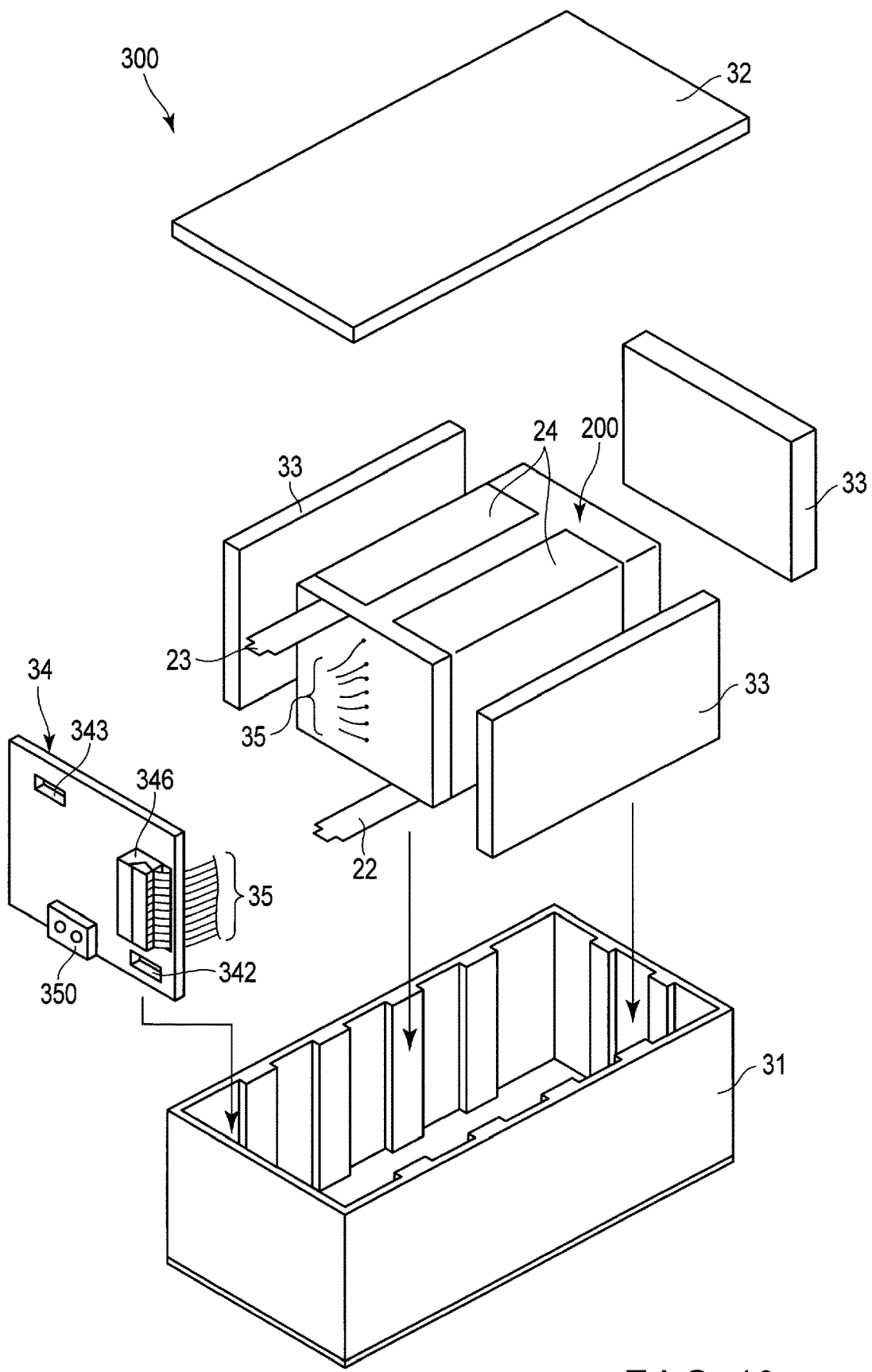
FIG. 10 is an exploded perspective view showing an example of a battery pack according to an embodiment.
Figure 11:
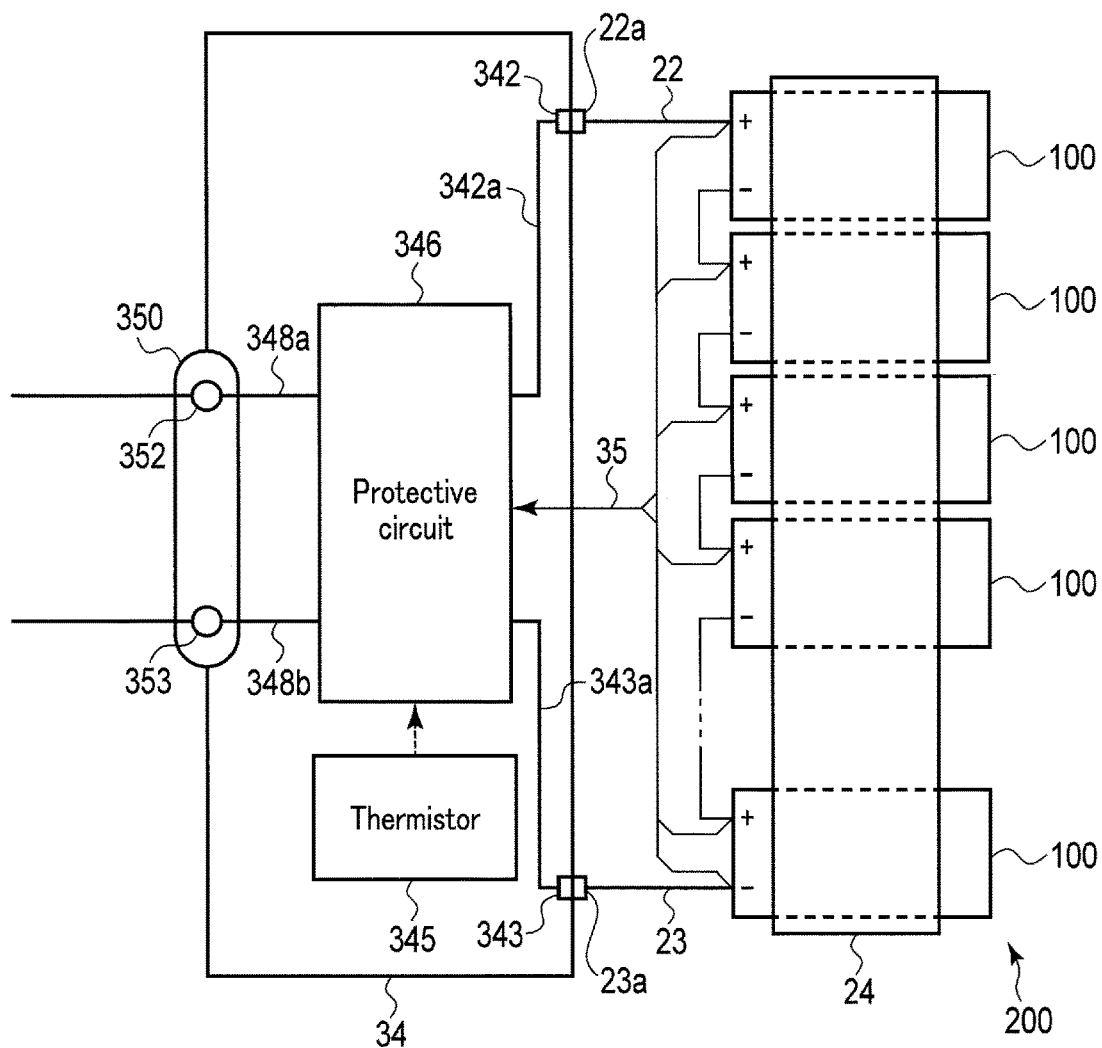
FIG. 11 is a block diagram showing an example of an electric circuit of the battery pack shown in FIG. 10.

FIG. 10 is an exploded perspective view schematically showing an example of the battery pack according to the fifth embodiment. FIG. 11 is a block diagram showing an example of an electric circuit of the battery pack shown in FIG. 10.

A battery pack 300 shown in FIGS. 10 and 11 includes a housing container 31, a lid 32, protective sheets 33, a battery module 200, a printed wiring board 34, wires 35, and an insulating plate (not shown).

The housing container 31 shown in FIG. 10 is a square-bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a battery according to the third embodiment. The plural single-batteries 100 are electrically connected in series, as shown in FIG. 11. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side (positive-side) wiring 348a, and a minus-side (negative-side) wiring 348b. One principal surface of the printed wiring board 34 faces a surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device (s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fifth embodiment is provided with the battery according to the third embodiment or the battery module according to the fourth embodiment. Accordingly, the battery pack can exhibit high input-output performance and excellent storage performance.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the sixth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the sixth embodiment is explained below, with reference to the drawings.

Figure 12:
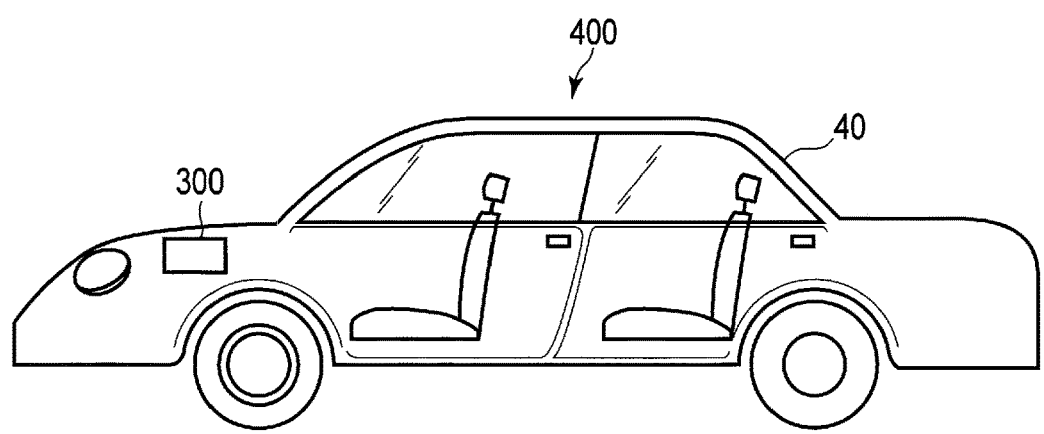
FIG. 12 is a partially see-through diagram schematically showing an example of a vehicle according to an embodiment.

FIG. 12 is a partially see-through diagram schematically showing an example of a vehicle according to the sixth embodiment.

A vehicle 400, shown in FIG. 12 includes a vehicle body 40 and a battery pack 300 according to the fifth embodiment. In the example shown in FIG. 12, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 12, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 13:
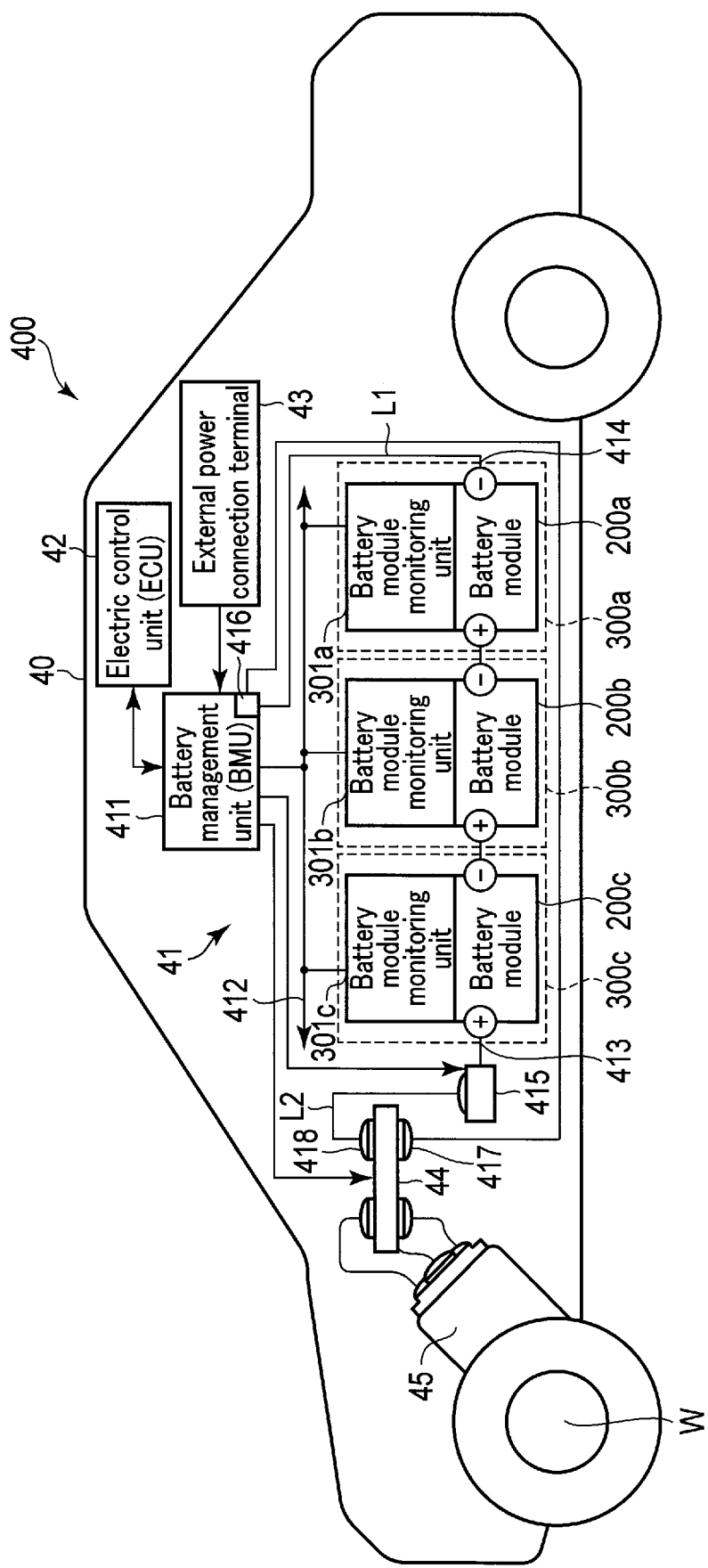
FIG. 13 is a diagram schematically showing an example of a control system related to an electric system in the vehicle according to the embodiment.

Next, with reference to FIG. 13, an aspect of operation of the vehicle according to the sixth embodiment is explained.

FIG. 13 is a diagram schematically showing an example of a control system related to an electric system in the vehicle according to the sixth embodiment. A vehicle 400, shown in FIG. 13, is an electric automobile.

The vehicle 400, shown in FIG. 13, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 13, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the battery according to the third embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 13) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (i.e., a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Thus, a high performance vehicle can be provided, by virtue of the high input-output performance of the battery pack. A vehicle of high reliability can be provided, by virtue of the battery pack being excellent in storage performance.

EXAMPLES

Hereinafter, the above-described embodiments are described in more detail based on Examples.

1. Solid Electrolyte Material

Synthesis

Examples A-1 to A-20

An oxide having a perovskite structure represented by General Formula A $(M\alpha_{1-w}M\beta_w)O_3$ was synthesized in the following manner.

First, raw materials were weighed in a predetermined molar ratio in order to obtain target compositions shown in Table 1 below, and mixed in a mortar. As specific examples of raw materials used, $Sr(NO_3)_2$, $Li_2CO_3$, $Nb_2O_5$, $Ta_2O_5$, and $TiO_2$ were used in Examples A-1 to A-6. Next, each of the mixtures was pre-fired at a temperature condition of 800° C. for 12 hours. Each of the pre-fired mixtures was pulverized and mixed again. Subsequently, each of the resulting pulverized mixture powders was subjected to uniaxial pressing into a pellet form (coin form) having a thickness of 1 mm and a diameter of 12 mm. The pellet was subjected to main firing for 1 hour at a temperature condition of 1350° C., thereby obtaining an oxide as a solid electrolyte material of Example A-6.

With regard to Examples A-1 to A-5 and Examples A-7 to A-20, each of the respective samples that had been subjected to the main firing were subjected to annealing treatment under an oxygen atmosphere. The samples were placed in a tubular furnace capable of filling with an atmospheric gas. The inside of the furnace was filled with pure oxygen gas, followed by subjecting the samples to annealing treatment at 600° C. for 12 hours, while performing a pure oxygen flow at 0.5 L/min, thereby obtaining oxides as solid electrolyte materials of Examples A-1 to A-5 and Examples A-7 to A-20.

Comparative Examples A-1 to A-3

Oxides were synthesized in the same manner as in Example A-1 except that the raw materials were weighed in a predetermined molar ratio in order to obtain a target composition shown in Table 2 below. In this way, oxides as solid electrolyte materials of Comparative Examples A-1 to A-3 were obtained.

Comparative Example A-4

An oxide as solid electrolyte material was obtained in the same manner as in Comparative Example A-1, except that $Ta_2O_5$ was added to the mixed powder before molding the pellet.

Examples B-1 to B-19

Oxides having a NASICON structure represented by General Formula $Li_xM\alpha_y(M\beta_{1-z}D_z)(PO_4)_3$ were synthesized.

First, raw materials were weighed in a predetermined molar ratio in order to obtain a target composition shown in Table 3 below, and mixed in a mortar. As specific examples of raw materials used, $Li_2CO_3$, $Nb_2O_5$, $Ta_2O_5$, $BaCO_3$, $ZrO_2$, and $NH_4H_2PO_4$ were used in Examples B-1 to B-6. In order to decompose phosphate, the mixtures were placed in an electric furnace, heated at 300° C. for 12 hours, and taken out of the heating furnace, followed by cooling at a cooling rate of 100° C./min.

Next, the mixtures were pre-fired at a temperature condition of 800° C. for 12 hours. The pre-fired mixtures were pulverized and mixed again. Subsequently, each of the resulting pulverized mixture powders was subjected to uniaxial pressing into a pellet form (coin form) having a thickness of 1 mm and a diameter of 12 mm. The pellet was subjected to main firing for 1 hour at a temperature condition of 1350° C., thereby obtaining an oxide as a solid electrolyte material of Example B-6.

With regard to Examples B-1 to B-5 and Examples B-7 to B-19, each of the respective samples that had been subjected to the main firing were subjected to annealing treatment under an oxygen atmosphere. The samples were placed in a tubular furnace capable of filling with an atmospheric gas. The inside of the furnace was filled with pure oxygen gas, followed by subjecting the samples to annealing treatment at 600° C. for 12 hours, while performing a pure oxygen flow at 0.5 L/min, thereby obtaining oxides as solid electrolyte materials of Examples B-1 to B-5 and Examples B-7 to B-20.

Comparative Examples B-1 to B-3

Oxides were synthesized in the same manner as in Example A-1 except that the raw materials were weighed in a predetermined molar ratio in order to obtain a target composition shown in Table 4 below. In this way, oxides as solid electrolyte materials of Comparative Examples B-1 to B-3 were obtained.

Comparative Example B-4

An oxide as solid electrolyte material was obtained in the same manner as in Comparative Example B-1, except that $Ta_2O_5$ was added to the mixed powder before molding the pellet.

<Evaluation>

Both of reverse surfaces of the pellets of the solid electrolyte materials obtained for the respective Examples and Comparative Examples were polished and smoothed, and side surfaces of the pellets (edge portion of the coin shape) were covered with a masking tape. Gold was deposited onto both the surfaces of the pellets smoothed by polishing to manufacture blocking electrodes.

(Li Ion Conductivity Measurement)

Next, in order to measure Li ion conductivities of the synthesized solid electrolyte materials, the blocking electrodes manufactured using the respective pellets were dried under vacuum at a temperature condition of 140° C. for 12 hours. Next, the blocking electrodes were each placed in a four-terminal measurement vessel filled with dry argon (Ar). Each four-terminal measurement vessel with the blocking electrode was placed in a thermostat, and maintained at set temperatures for 2 hours, and then, impedance was measured using an impedance analyzer 4192A manufactured by YOKOGAWA Hewlett-Packard. The temperature for the measurement was set to 25° C. A measurement frequency range was set to be from 5 Hz to 13 MHz, a resistance value of a bulk part was calculated from the measurement result of complex impedance, and the lithium ion conductivity $\sigma_b$ (S/cm) in the bulk part was calculated using an electrode area and thickness of the pellet.

(Measurement of Valence and Reduction Resistance Test)

The valences of Nb and Ta in each of the oxides of the respective solid electrolyte materials were measured by performing the EPMA measurement by the method described above. The measurement results are shown in Tables 1 to 4 below.

Next, a reduction resistance test was performed in order to examine whether or not the synthesized solid electrolyte materials can maintain stability at a potential equal to that of metal lithium. First, for each of the blocking electrodes respectively using the pellets of the solid electrolyte materials, both surfaces of the pellet were polished using a wrapping film #800 (manufactured by 3M) to thereby completely scrape off the gold electrode. Using each of the pellets, a circular metal lithium foil having a diameter of 10 mm was put in contact with one surface of the pellet for 1 hour in an argon atmosphere. After one hour, the pellet was taken out of the argon atmosphere, and then EPMA measurements were performed for the surface that had been in contact with metal lithium and a surface that had not been in contact. A difference in peaks before and after the contact were compared. A case where the differences in peaks attributable to reduction were not found was judged as "absence of reduction (Absent)", and a case where the difference in peaks were found was judged as "presence of reduction (Present)". The judgement results are shown Tables 1 to 4 below.

(Powder X-Ray Diffraction Measurement)

Powder X-ray diffraction measurement was performed on the obtained samples as follows.

The respective pellets were pulverized until an average particle diameter was about 10 μm, using a mortar and pestle. Each pulverized sample was filled in a holder section having a depth of 0.2 mm formed on a glass sample plate. Subsequently, each sample was smoothed by sufficient pressing using another glass plate from the outside. Next, the glass plate filled with the sample was set in a powder X-ray diffractometer, and diffraction patterns were obtained using a Cu-Kα ray. From results of analyzing the crystal phases and space groups using a crystal structure analysis according to the Rietveld method, it has been confirmed that the samples had the target crystal structure.

In more detail, with regard to Examples A-1 to A-20 and Comparative Examples A-1 to A-4 (the A series Examples and Comparative Examples), it was confirmed that a perovskite structure had been obtained. Crystal phases and space groups of the oxides in the respective solid electrolyte materials in the A series are shown in Tables 1 and 2. With regard to Examples B-1 to B-19 and Comparative Examples B-1 to B-4 (the B series Examples and Comparative Examples), it was confirmed that a NASICON structure had been obtained. Crystal phases and space groups of the oxides in each of the solid electrolyte materials in the B series are shown in Tables 3 and 4.

Tables 1 to 4 below summarize details of compositions and crystal structures of the oxides in the solid electrolyte materials synthesized in the A series Examples and Comparative Examples and the B series Examples and Comparative Examples. As each of the compositions thereof, chemical composition formula, mass ratio $\alpha_{Ta}/\alpha_{Nb}$, valences of Nb and Ta, presence or absence of a primary element $M\beta_p$ and species thereof, presence or absence of a supplementary element $M\beta_s$ and species thereof, and an element ratio $E\beta_s/E_{Nb}$ of the supplementary element $M\beta_s$ to Nb in the oxide are shown. As details of the crystal structure, a primary crystal phase and a space group of the primary phase are shown. It should be noted that in all of the samples of the A series, oxides having a perovskite crystal structure were obtained, and in all the samples of the B series, oxides having a NASICON crystal structure were obtained.

TABLE 1

| | Composition | $\alpha_{Ta}/\alpha_{Nb}$ | Valence Nb:Ta | $M\beta_p$ | $M\beta_s$ | $E\beta_s/E_{Nb}$ | Crystal phase | Primary phase Space group |
|---|---|---|---|---|---|---|---|---|
| Example A-1 | $Sr_{0.56}Li_{0.33}M\alpha_{0.56}M\beta_{0.44}O_3$ | $5 \times 10^{-5}$ | 5.0:5.0 | Ti | None | 0 | Cubic | Pm3m |
| Example A-2 | $Sr_{0.56}Li_{0.33}M\alpha_{0.56}M\beta_{0.44}O_3$ | $1 \times 10^{-4}$ | 5.0:5.0 | Ti | None | 0 | Cubic | Pm3m |
| Example A-3 | $Sr_{0.56}Li_{0.33}M\alpha_{0.56}M\beta_{0.44}O_3$ | $8 \times 10^{-4}$ | 5.0:5.0 | Ti | None | 0 | Cubic | Pm3m |
| Example A-4 | $Sr_{0.56}Li_{0.33}M\alpha_{0.56}M\beta_{0.44}O_3$ | $1 \times 10^{-3}$ | 5.0:5.0 | Ti | None | 0 | Cubic | Pm3m |
| Example A-5 | $Sr_{0.56}Li_{0.33}M\alpha_{0.56}M\beta_{0.44}O_3$ | $3 \times 10^{-3}$ | 5.0:5.0 | Ti | None | 0 | Cubic | Pm3m |
| Example A-6 | $Sr_{0.56}Li_{0.33}M\alpha_{0.56}M\beta_{0.44}O_3$ | $1 \times 10^{-3}$ | 4.8:5.0 | Ti | None | 0 | Cubic | Pm3m |
| Example A-7 | $Sr_{0.56}Li_{0.33}M\alpha_{0.56}M\beta_{0.44}O_3$ | $1 \times 10^{-3}$ | 5.0:5.0 | Zr | None | 0 | Cubic | Pm3m |
| Example A-8 | $Sr_{0.56}Li_{0.33}M\alpha_{0.56}M\beta_{0.44}O_3$ | $1 \times 10^{-3}$ | 5.0:5.0 | Ga | None | 0 | Cubic | Pm3m |
| Example A-9 | $Sr_{0.56}Li_{0.33}M\alpha_{0.56}M\beta_{0.44}O_3$ | $1 \times 10^{-3}$ | 5.0:5.0 | Ge | None | 0 | Cubic | Pm3m |
| Example A-10 | $Sr_{0.56}Li_{0.33}M\alpha_{0.56}M\beta_{0.44}O_3$ | $1 \times 10^{-3}$ | 5.0:5.0 | Ti | Si | $1 \times 10^{-4}$ | Cubic | Pm3m |
| Example A-11 | $Sr_{0.56}Li_{0.33}M\alpha_{0.56}M\beta_{0.44}O_3$ | $1 \times 10^{-3}$ | 5.0:5.0 | Ti | P | $5 \times 10^{-4}$ | Cubic | Pm3m |
| Example A-12 | $Sr_{0.56}Li_{0.33}M\alpha_{0.56}M\beta_{0.44}O_3$ | $1 \times 10^{-3}$ | 5.0:5.0 | Ti | P | $1 \times 10^{-3}$ | Cubic | Pm3m |
| Example A-13 | $Sr_{0.56}Li_{0.33}M\alpha_{0.56}M\beta_{0.44}O_3$ | $1 \times 10^{-3}$ | 5.0:5.0 | Ti | P | $5 \times 10^{-3}$ | Cubic | Pm3m |
| Example A-14 | $Sr_{0.56}Li_{0.33}M\alpha_{0.56}M\beta_{0.44}O_3$ | $1 \times 10^{-3}$ | 5.0:5.0 | Ti | Fe | $5 \times 10^{-4}$ | Cubic | Pm3m |

TABLE 1-continued

|  | Composition | $\alpha_{Ta}/\alpha_{Nb}$ | Valence Nb:Ta | $M\beta_p$ | $M\beta_s$ | $E_{\beta s}/E_{Nb}$ | Crystal phase | Primary phase Space group |
|---|---|---|---|---|---|---|---|---|
| Example A-15 | $Sr_{0.56}Li_{0.33}M\alpha_{0.56}M\beta_{0.44}O_3$ | $1 \times 10^{-3}$ | 5.0:5.0 | Ti | Fe | $1 \times 10^{-3}$ | Cubic | Pm3m |
| Example A-16 | $Sr_{0.56}Li_{0.33}M\alpha_{0.56}M\beta_{0.44}O_3$ | $1 \times 10^{-3}$ | 5.0:5.0 | Ti | Fe | $5 \times 10^{-3}$ | Cubic | Pm3m |
| Example A-17 | $Ca_{0.46}K_{0.1}Li_{0.33}M\alpha_{0.66}M\beta_{0.34}O_3$ | $1.5 \times 10^{-3}$ | 5.0:5.0 | Ti | None | 0 | Cubic | Pm3m |
| Example A-18 | $Sr_{0.46}Na_{0.1}Li_{0.33}M\alpha_{0.66}M\beta_{0.34}O_3$ | $1.5 \times 10^{-3}$ | 5.0:5.0 | Ti | None | 0 | Cubic | Pm3m |
| Example A-19 | $La_{0.28}Mg_{0.28}Li_{0.33}M\alpha_{0.28}M\beta_{0.72}O_3$ | $1.5 \times 10^{-3}$ | 5.0:5.0 | Ti | None | 0 | Cubic | Pm3m |
| Example A-20 | $LiM\alpha O_3$ | $1 \times 10^{-3}$ | 5.0:5.0 | None | None | 0 | Trigonal | R3c |

TABLE 2

|  | Composition | $\alpha_{Ta}/\alpha_{Nb}$ | Valence Nb:Ta | $M\beta_p$ | $M\beta_s$ | $E_{\beta s}/E_{Nb}$ | Crystal phase | Primary phase Space group |
|---|---|---|---|---|---|---|---|---|
| Comparative Example A-1 | $Sr_{0.56}Li_{0.33}M\alpha_{0.56}M\beta_{0.44}O_3$ | 0 | 5.0:(no Ta) | Ti | None | 0 | Cubic | Pm3m |
| Comparative Example A-2 | $Sr_{0.56}Li_{0.33}M\alpha_{0.56}M\beta_{0.44}O_3$ | $4 \times 10^{-3}$ | 5.0:5.0 | Ti | None | 0 | Cubic | Pm3m |
| Comparative Example A-3 | $Sr_{0.56}Li_{0.33}M\alpha_{0.56}M\beta_{0.44}O_3$ | $1 \times 10^{-5}$ | 5.0:5.0 | Ti | None | 0 | Cubic | Pm3m |
| Comparative Example A-4 | $Sr_{0.56}Li_{0.33}M\alpha_{0.56}M\beta_{0.44}O_3 + Ta_2O_5$ | 0 | 5.0:5.0 | Ti | None | 0 | Cubic | Pm3m |

TABLE 3

|  | Composition | $\alpha_{Ta}/\alpha_{Nb}$ | Valence Nb:Ta | $M\beta_p$ | $M\beta_s$ | $E_{\beta s}/E_{Nb}$ | Crystal phase | Primary phase Space group |
|---|---|---|---|---|---|---|---|---|
| Example B-1 | $LiM\alpha (M\beta_{0.5}Ba_{0.5}) (PO_4)_3$ | $5 \times 10^{-5}$ | 5.0:5.0 | Zr | None | 0 | Rhombohedral | R-3c |
| Example B-2 | $LiM\alpha (M\beta_{0.5}Ba_{0.5}) (PO_4)_3$ | $1 \times 10^{-4}$ | 5.0:5.0 | Zr | None | 0 | Rhombohedral | R-3c |
| Example B-3 | $LiM\alpha (M\beta_{0.5}Ba_{0.5}) (PO_4)_3$ | $8 \times 10^{-4}$ | 5.0:5.0 | Zr | None | 0 | Rhombohedral | R-3c |
| Example B-4 | $LiM\alpha (M\beta_{0.5}Ba_{0.5}) (PO_4)_3$ | $1 \times 10^{-3}$ | 5.0:5.0 | Zr | None | 0 | Rhombohedral | R-3c |
| Example B-5 | $LiM\alpha (M\beta_{0.5}Ba_{0.5}) (PO_4)_3$ | $3 \times 10^{-3}$ | 5.0:5.0 | Zr | None | 0 | Rhombohedral | R-3c |
| Example B-6 | $LiM\alpha (M\beta_{0.5}Ba_{0.5}) (PO_4)_3$ | $1 \times 10^{-3}$ | 4.7:5.0 | Zr | None | 0 | Rhombohedral | R-3c |
| Example B-7 | $LiM\alpha (M\beta_{0.5}Ba_{0.5}) (PO_4)_3$ | $1 \times 10^{-3}$ | 5.0:5.0 | Ti | None | 0 | Rhombohedral | R-3c |
| Example B-8 | $LiM\alpha (M\beta_{0.5}Ba_{0.5}) (PO_4)_3$ | $1 \times 10^{-3}$ | 5.0:5.0 | Ga | None | 0 | Rhombohedral | R-3c |
| Example B-9 | $LiM\alpha (M\beta_{0.5}Ba_{0.5}) (PO_4)_3$ | $1 \times 10^{-3}$ | 5.0:5.0 | Ge | None | 0 | Rhombohedral | R-3c |
| Example B-10 | $LiM\alpha (M\beta_{0.5}Ba_{0.5}) (PO_4)_3$ | $1 \times 10^{-3}$ | 5.0:5.0 | Ti | Si | $1 \times 10^{-4}$ | Rhombohedral | R-3c |
| Example B-11 | $LiM\alpha (M\beta_{0.5}Ba_{0.5}) (PO_4)_3$ | $1.5 \times 10^{-3}$ | 5.0:5.0 | Zr | P | $5 \times 10^{-4}$ | Rhombohedral | R-3c |
| Example B-12 | $LiM\alpha (M\beta_{0.5}Ba_{0.5}) (PO_4)_3$ | $1.5 \times 10^{-3}$ | 5.0:5.0 | Zr | P | $1 \times 10^{-3}$ | Rhombohedral | R-3c |
| Example B-13 | $LiM\alpha (M\beta_{0.5}Ba_{0.5}) (PO_4)_3$ | $1.5 \times 10^{-3}$ | 5.0:5.0 | Zr | P | $5 \times 10^{-3}$ | Rhombohedral | R-3c |
| Example B-14 | $LiM\alpha (M\beta_{0.5}Ba_{0.5}) (PO_4)_3$ | $1.5 \times 10^{-3}$ | 5.0:5.0 | Zr | Fe | $5 \times 10^{-4}$ | Rhombohedral | R-3c |
| Example B-15 | $LiM\alpha (M\beta_{0.5}Ba_{0.5}) (PO_4)_3$ | $1.5 \times 10^{-3}$ | 5.0:5.0 | Zr | Fe | $1 \times 10^{-3}$ | Rhombohedral | R-3c |
| Example B-16 | $LiM\alpha (M\beta_{0.5}Ba_{0.5}) (PO_4)_3$ | $1.5 \times 10^{-3}$ | 5.0:5.0 | Zr | Fe | $5 \times 10^{-3}$ | Rhombohedral | R-3c |
| Example B-17 | $LiM\alpha (M\beta_{0.5}Ba_{0.5}) (PO_4)_3$ | $1.5 \times 10^{-3}$ | 5.0:5.0 | Zr | None | 0 | Cubic | C 2/c |
| Example B-18 | $LiM\alpha (M\beta_{0.5}Ba_{0.5}) (PO_4)_3$ | $1.5 \times 10^{-3}$ | 5.0:5.0 | Zr | None | 0 | Rhombohedral | R-3c |
| Example B-19 | $Li_2M\alpha Ba (PO_4)_3$ | $1 \times 10^{-3}$ | 5.0:5.0 | None | None | 0 | Rhombohedral | R-3c |

TABLE 4

|  | Composition | $\alpha_{Ta}/\alpha_{Nb}$ | Valence Nb:Ta | $M\beta_p$ | $M\beta_s$ | $E_{\beta s}/E_{Nb}$ | Crystal phase | Primary phase Space group |
|---|---|---|---|---|---|---|---|---|
| Comparative Example B-1 | $LiM\alpha (M\beta_{0.5}Ba_{0.5}) (PO_4)_3$ | 0 | 5.0:(no Ta) | Zr | None | 0 | Rhombohedral | R-3c |
| Comparative Example B-2 | $LiM\alpha (M\beta_{0.5}Ba_{0.5}) (PO_4)_3$ | $4 \times 10^{-3}$ | 5.0:5.0 | Zr | None | 0 | Rhombohedral | R-3c |

TABLE 4-continued

| Composition | | $\alpha_{Ta}/\alpha_{Nb}$ | Valence Nb:Ta | $M\beta_p$ | $M\beta_s$ | $E_{\beta_s}/E_{Nb}$ | Crystal phase | Primary phase Space group |
|---|---|---|---|---|---|---|---|---|
| Comparative Example B-3 | LiMα (Mβ$_{0.5}$Ba$_{0.5}$) (PO$_4$)$_3$ | 1 × 10$^{-5}$ | 5.0:5.0 | Zr | None | 0 | Rhombohedral | R-3c |
| Comparative Example B-4 | LiMα (Mβ$_{0.5}$Ba$_{0.5}$) (PO$_4$)$_3$ + Ta$_2$O$_5$ | 0 | 5.0:5.0 | Zr | None | 0 | Rhombohedral | R-3c |

Table 5 below summarizes results of Li ion conductivity measurement and results of the reduction resistance test for the solid electrolyte materials obtained in the A series Examples and Comparative Examples. Table 6 summarizes results of Li ion conductivity measurement and results of the reduction resistance test for the solid electrolyte materials obtained in the B series Examples and Comparative Examples.

TABLE 5

| | Conductivity σ$_b$ at 25° C. (S/cm) | Reduction due to metal Li |
|---|---|---|
| Example A-1 | 5.2 × 10$^{-4}$ | Absent |
| Example A-2 | 8.4 × 10$^{-4}$ | Absent |
| Example A-3 | 8.6 × 10$^{-4}$ | Absent |
| Example A-4 | 8.9 × 10$^{-4}$ | Absent |
| Example A-5 | 8.2 × 10$^{-4}$ | Absent |
| Example A-6 | 2.3 × 10$^{-4}$ | Absent |
| Example A-7 | 4.6 × 10$^{-4}$ | Absent |
| Example A-8 | 1.4 × 10$^{-4}$ | Absent |
| Example A-9 | 1.7 × 10$^{-4}$ | Absent |
| Example A-10 | 9.2 × 10$^{-4}$ | Absent |
| Example A-11 | 9.5 × 10$^{-4}$ | Absent |
| Example A-12 | 9.6 × 10$^{-4}$ | Absent |
| Example A-13 | 9.0 × 10$^{-4}$ | Absent |
| Example A-14 | 9.3 × 10$^{-4}$ | Absent |
| Example A-15 | 1.1 × 10$^{-3}$ | Absent |
| Example A-16 | 9.1 × 10$^{-4}$ | Absent |
| Example A-17 | 5.9 × 10$^{-4}$ | Absent |
| Example A-18 | 6.2 × 10$^{-4}$ | Absent |
| Example A-19 | 8.5 × 10$^{-4}$ | Absent |
| Example A-20 | 1.2 × 10$^{-4}$ | Absent |
| Comparative Example A-1 | 8.9 × 10$^{-5}$ | Present |
| Comparative Example A-2 | 9.2 × 10$^{-5}$ | Absent |
| Comparative Example A-3 | 1.0 × 10$^{-4}$ | Present |
| Comparative Example A-4 | 1.7 × 10$^{-5}$ | Present |

TABLE 6

| | Conductivity σ$_b$ at 25° C. (S/cm) | Reduction due to metal Li |
|---|---|---|
| Example B-1 | 2.1 × 10$^{-4}$ | Absent |
| Example B-2 | 3.9 × 10$^{-4}$ | Absent |
| Example B-3 | 4.0 × 10$^{-4}$ | Absent |
| Example B-4 | 4.2 × 10$^{-4}$ | Absent |
| Example B-5 | 3.7 × 10$^{-4}$ | Absent |
| Example B-6 | 1.0 × 10$^{-4}$ | Absent |
| Example B-7 | 2.4 × 10$^{-4}$ | Absent |
| Example B-8 | 7.1 × 10$^{-5}$ | Absent |
| Example B-9 | 8.3 × 10$^{-5}$ | Absent |
| Example B-10 | 4.5 × 10$^{-4}$ | Absent |
| Example B-11 | 4.7 × 10$^{-4}$ | Absent |
| Example B-12 | 4.9 × 10$^{-4}$ | Absent |
| Example B-13 | 4.2 × 10$^{-4}$ | Absent |
| Example B-14 | 4.8 × 10$^{-4}$ | Absent |
| Example B-15 | 5.6 × 10$^{-4}$ | Absent |
| Example B-16 | 4.5 × 10$^{-4}$ | Absent |
| Example B-17 | 2.6 × 10$^{-4}$ | Absent |
| Example B-18 | 3.4 × 10$^{-4}$ | Absent |
| Example B-19 | 5.5 × 10$^{-5}$ | Absent |
| Comparative Example B-1 | 4.1 × 10$^{-5}$ | Present |
| Comparative Example B-2 | 5.0 × 10$^{-5}$ | Absent |
| Comparative Example B-3 | 5.5 × 10$^{-5}$ | Present |
| Comparative Example B-4 | 3.3 × 10$^{-5}$ | Present |

It can be seen from the results shown in Table 5 that solid electrolyte materials including oxides that include an octahedral coordination structure having oxygen atoms arranged centered about a metal element M, the metal element M including a metal element Mα consisting of Nb and Ta, where a mass ratio $\alpha_{Ta}/\alpha_{Nb}$ of a mass $\alpha_{Ta}$ of the Ta to a mass $\alpha_{Nb}$ of the Nb is within a range of $5\times10^{-5}\leq\alpha_{Ta}/\alpha_{Nb}\leq3\times10^{-3}$, have high Li ion conductivities and exhibit excellent reduction resistance performance.

2. Battery

In order to examine discharge performance of batteries using the solid electrolyte materials obtained in each of the examples and comparative examples, all-solid batteries using the respective solid electrolyte materials were produced. More specifically, batteries were prepared, each including a single stack electrode body composed of a positive electrode layer/electrolyte layer (composite electrolyte layer)/negative electrode layer shown in FIG. 3.

As a positive electrode active material, used were particles of LiMn$_{0.85}$Fe$_{0.1}$Mg$_{0.05}$PO$_4$ having an olivine structure in which primary particles had an average particle diameter of 50 nm, the primary particle having carbon fine particles (average particle diameter of 5 nm) adhered on a surface thereof (adhesion amount of 0.1% by mass). The particles of the positive electrode active material, vapor grown carbon fibers having a fiber diameter of 0.1 μm as electro-conductive agent, graphite powder as electro-conductive agent, and PVdF as binder were mixed at a mass ratio of 100:3:5:5, and dispersed in a n-methyl pyrrolidone (NMP) solvent to prepare a slurry. Then, the obtained slurry was applied onto one surface of an aluminum alloy foil (purity of 99%) having a thickness of 15 μm. The coated film of the slurry was dried and pressed to produce a positive electrode having a positive electrode layer with a thickness of 67 μm formed on one surface of the current collector (aluminum alloy foil), wherein an electrode density was 2.2 g/cm$^3$ (not including the current collector).

As the negative electrode active material, the following oxide particles were used. Li$_4$Ti$_5$O$_{12}$ particles in which an average particle diameter was D$_{50}$=0.8 µm, and a specific surface area was 10 m$^2$/g were used in Example C-1. Li$_2$Na$_2$Ti$_6$O$_{14}$ particles in which an average particle diameter was D$_{50}$=0.6 µm, and a specific surface area was 15 m$^2$/g were used in Example C-2. Nb$_2$TiO$_7$ particles in which an average particle diameter was D$_{50}$=1.0 µm, and a specific surface area was 8 m$^2$/g were used in Example C-3. The respective negative electrode active material particles, graphite powder having an average particle diameter of 6 µm as electro-conductive agent, and PVdF as binder were mixed at a mass ratio of 95:3:2, and dispersed in n-methyl pyrrolidone (NMP) solution, then stirred using a ball mill under conditions with a revolution rate of 1000 rpm and a stirring time of 2 hours, thereby preparing a slurry. The obtained slurry was applied onto an aluminum alloy foil (purity of 99.3%) having a thickness of 15 µm. A coated film of the slurry was dried, followed by a hot pressing process, thereby producing a negative electrode. Accordingly, the negative electrode having a negative electrode layer with a thickness of about 59 µm formed on one surface of the current collector (aluminum alloy foil), wherein an electrode density was 2.2 g/cm$^3$ (not including the current collector), was produced. Porosity of the negative electrode excluding the current collector was approximately 35%.

A composite electrolyte used for the electrolyte layer was prepared as follows. First, the solid electrolyte particles synthesized in Example A-12 were pulverized until the primary particle size (diameter) was 1 µm. A predetermined amount of the pulverized solid electrolyte particles were mixed into a gel polyacrylonitrile polymer that contained a mixed solvent including propylene carbonate (PC) and diethyl carbonate (DEC) (volume ratio of 1:2) with 1.2 M LiPF$_6$ dissolved therein, whereby a composite was obtained, to thereby produce an electrolyte layer of a composite electrolyte having a thickness of 2 µm between the positive electrode layer of positive electrodes obtained as described above and the negative electrode layer of the respective negative electrodes obtained as described above. Here, the mass ratio of the solid electrolyte particles, the PC/DEC mixed solvent, and the gel polyacrylonitrile polymer was 96:3.2:0.8.

More specifically, in obtaining the composite electrolyte, the solid electrolyte particles synthesized in Example A-12 were first dispersed in a PVdF binder solution dissolved in an n-methyl pyrrolidone (NMP) solution before gelling, and the obtained dispersion solution was applied onto the positive electrode layer and the negative electrode layer. After the dispersion solution was dried, a solution including polyacrylonitrile (PAN) polymer (2 mass %) and PC/DEC mixed solvent (volume ratio 1:2) with 1.2 M LiPF$_6$ dissolved therein, and having 2,2'-azobis-4-methoxy-2,4-dimethylvaleronitrile added thereto as a radical initiator for initiating polymerization, was impregnated into each of the electrode layers and the binder thereon, followed by heating, thereby preparing a gelled composite electrolyte. Here, organic components in the electrode layers and the composite electrolyte were adjusted to be 3% and 4% by mass, respectively. In addition, a weight ratio of inorganic particles, binder, and organic components in the composite electrolyte was 94.3:1.9:3.8. A mass ratio of the organic electrolyte (PC/DEC solution of LiPF$_6$) in the composite electrolyte was 3.0%. The produced single stack lithium batteries (all solid batteries) were designated as Examples C-1 to C-3 according to the negative electrode active materials used as described above. Then, a single stack battery (all solid battery) was produced in the same manner as in Example C-1, except that the solid electrolyte particles synthesized in Comparative Example A-1 were used, and the produced battery was designated as Comparative Example C-1.

Next, batteries were produced in the same manner as in Examples C-1 to C-3 except that the solid electrolyte particles synthesized in Example B-12 was used, and these lithium batteries were designated as Examples D-1 to D-3, respectively. Additionally, a battery was produced in the same manner as in Comparative Example C-1 except that the solid electrolyte particles synthesized in Comparative Example B-1 was used, and the battery was designated as Comparative Example D-1.

<Evaluation>

(Charge-Discharge Measurement)

For each of the batteries produced in Examples C-1 to C-3 and Comparative Example C-1, as well as the batteries produced in Examples D-1 to D-3 and Comparative Example D1, a charge and discharge test was performed under a 25° C. environment. For the batteries using Li$_4$Ti$_5$O$_{12}$ or Nb$_2$TiO$_7$ as the negative electrode active material (Example C-1, Comparative Example C-1, Example D-1, and Comparative Example D-1, as well as Example C-3 and Example D-3), a charge and discharge range in the charge and discharge test was set to a potential range where the negative electrode potential was 1.0 V to 1.7 V (vs. Li/Li$^+$) With regard to the batteries using Li$_2$Na$_2$Ti$_6$O$_{14}$ as the negative electrode active material (Example C-2 and Example D-2), the charge and discharge range was set to a potential range where the negative electrode potential was 1.0 V to 3.0 V (vs. Li/Li$^+$). When examining the capacity, charge and discharge was performed with a charge and discharge current value set to 0.01C (hourly discharge rate) at a temperature condition of 25° C., and a discharge capacity at this time was set as a reference capacity (100%). Then, charge and discharge was performed at a temperature condition of 25° C. at 0.1 C, and a 0.1 C-discharge capacity retention ratio with respect to the reference capacity was calculated (0.1 C-discharge capacity retention ratio=[0.1 C-discharge capacity at 25° C.]/[reference capacity]).

(Storage Test)

The respective batteries were subjected to a storage test.

First, each of the batteries were charged at a constant current of 0.01 C rate under a 25° C. environment. The charged batteries were retained for 24 hours under the 25° C. environment. Next, the respective batteries were discharged at a constant current of 0.01 C rate. The discharge capacity obtained by this discharge was designated as "post-storage discharge capacity". A post-storage discharge capacity retention ratio of the post-storage discharge capacity with respect to the reference capacity was calculated (Post-storage discharge capacity retention ratio=[post-storage discharge capacity]/[Reference capacity]).

Configurations of the electrode bodies of the batteries produced in Examples C-1 to C-3 and Comparative Example C-1, and results of the charge and discharge tests are shown in Table 7 below.

Configurations of the electrode bodies of the batteries produced in Examples D-1 to D-3 and Comparative Example D-1, and results of the charge and discharge tests are shown in Table 8 below.

TABLE 7

| | Configuration of Electrode Body Positive electrode active material in positive electrode layer/Solid electrolyte in composite electrolyte/Negative electrode active material in negative electrode layer | 0.01 C-discharge capacity at 25° C. (mAh) | 0.1 C-discharge capacity retention ratio at 25° C. (%) | Post-storage discharge capacity retention ratio (%) |
|---|---|---|---|---|
| Comparative Example C-1 | $LiMn_{0.85}Fe_{0.1}Mg_{0.05}PO_4$/Solid electrolyte material of Comparative Example A-1/$Li_4Ti_5O_{12}$ | 14 | 73 | 67 |
| Example C-1 | $LiMn_{0.85}Fe_{0.1}Mg_{0.05}PO_4$/Solid electrolyte material of Example A-12/$Li_4Ti_5O_{12}$ | 20 | 92 | 90 |
| Example C-2 | $LiMn_{0.85}Fe_{0.1}Mg_{0.05}PO_4$/Solid electrolyte material of Example A-12/$Li_2Na_2Ti_6O_{14}$ | 18 | 90 | 89 |
| Example C-3 | $LiMn_{0.85}Fe_{0.1}Mg_{0.05}PO_4$/Solid electrolyte material of Example A-12/$Nb_2TiO_7$ | 31 | 96 | 95 |

TABLE 8

| | Configuration of Electrode Body Positive electrode active material in positive electrode layer/Solid electrolyte in composite electrolyte/Negative electrode active material in negative electrode layer | 0.01 C-discharge capacity at 25° C. (mAh) | 0.1 C-discharge capacity retention ratio at 25° C. (%) | Post-storage discharge capacity retention ratio (%) |
|---|---|---|---|---|
| Comparative Example D-1 | $LiMn_{0.85}Fe_{0.1}Mg_{0.05}PO_4$/Solid electrolyte material of Comparative Example B-1/$Li_4Ti_5O_{12}$ | 12 | 69 | 65 |
| Example D-1 | $LiMn_{0.85}Fe_{0.1}Mg_{0.05}PO_4$/Solid electrolyte material of Example B-12/$Li_4Ti_5O_{12}$ | 18 | 91 | 90 |
| Example D-2 | $LiMn_{0.85}Fe_{0.1}Mg_{0.05}PO_4$/Solid electrolyte material of Example B-12/$Li_2Na_2Ti_6O_{14}$ | 17 | 88 | 87 |
| Example D-3 | $LiMn_{0.85}Fe_{0.1}Mg_{0.05}PO_4$/Solid electrolyte material of Example B-12/$Nb_2TiO_7$ | 30 | 95 | 95 |

As shown in Table 7, the batteries produced in Examples C-1 to C-3 exhibited a 0.1 C-discharge capacity retention ratio of 90% or more with respect to the reference capacity (0.01 C rate discharge at 25° C.). These batteries were found to maintain a post-storage discharge capacity retention ratio of 89% or more, as well. In contrast, the battery produced in Comparative Example C-1 was found to have a low 0.1 C-discharge capacity retention ratio. The post-discharge capacity retention ratio thereof was also low.

As shown in Table 8, the batteries produced in Examples D-1 to D-3 showed a high-rate discharge capacity retention ratio of 88% or more with respect to the reference capacity (0.01 C rate discharge at 25° C.). These batteries were found to maintain a post-storage discharge capacity retention ratio of 87% or more, as well. In contrast, the battery produced in Comparative Example D-1 was found to have a low 0.1 C-discharge capacity retention ratio. The post-storage discharge capacity ratio thereof was also low.

It can be appreciated from the above-described results that the battery having excellent input-output performance and storage performance can be obtained by using the solid electrolyte material according to the embodiment.

According to at least one embodiment and example described above, a solid electrolyte material is provided. The solid electrolyte material includes an oxide including an octahedral coordination structure that includes a metal element M and oxygen atoms arranged centered around the metal element M. The metal element M includes Nb and Ta. A mass ratio $\alpha_{Ta}/\alpha_{Nb}$ between a mass $\alpha_{Nb}$ of Nb and a mass $\alpha_{Ta}$ of Ta is within the range of $5\times10^{-5} \leq \alpha_{Ta}/\alpha_{Nb} \leq 3\times10^{-3}$. By virtue of such a composition, the solid electrolyte has excellent reduction resistance and exhibits high ion conductivity. Further, there can be provided a battery and battery pack with high input-output performance and excellent storage performance, and a vehicle including the battery pack.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A solid electrolyte material comprising:
an oxide comprising an octahedral coordination structure, the octahedral coordination structure comprising a metal element M and oxygen atoms arranged centering on the metal element M, the metal element M comprising Nb and Ta, and a mass ratio $\alpha_{Ta}/\alpha_{Nb}$ of a mass $\alpha_{Ta}$ of the Ta to a mass $\alpha_{Nb}$ of the Nb being within a range of $5\times10^{-5} \leq \alpha_{Ta}/\alpha_{Nb} \leq 3\times10^{-3}$, wherein a crystal structure of the oxide comprises at least one selected from the group consisting of a perovskite structure and a NASICON structure.

2. The solid electrolyte material according to claim 1, wherein the metal element M further comprises at least one metal element Mβ selected from the group consisting of Ti, Zr, Ga, Ge, Si, Fe, and P.

3. The solid electrolyte material according to claim 2, wherein the metal element M comprises a supplementary element $Mβ_s$ selected from the group consisting of Si, Fe, and P from among the metal elements Mβ, and an element ratio $Eβ_s/E_{Nb}$ of an element abundance ratio $Eβ_s$ of the supplementary element $Mβ_s$ to an element abundance ratio $E_{Nb}$ of the Nb is $1\times10^{-4}$ or more and $5\times10^{-3}$ or less.

4. The solid electrolyte material according to claim 1, wherein the oxide has the perovskite structure and is represented by General Formula $A(Mα_{1-w}Mβ_w)O_3$ where w is within a range of $0 \leq w \leq 1$, A-sites comprise Li and holes, and Mα comprises the Nb and the Ta.

5. The solid electrolyte material according to claim 4, wherein the oxide further comprises, in the A-sites, at least one selected from the group consisting of La, Sr, Mg, Na, K, and Ca.

6. The solid electrolyte material according to claim 1, wherein the oxide has the NASICON structure, the NASICON structure comprises at least one selected from the group consisting of a rhombohedral structure and a monoclinic structure, and the oxide is represented by General Formula $Li_xM\alpha_y(M\beta_{1-z}D_z)(PO_4)_3$, where Ma comprises the Nb and the Ta; D is at least one selected from the group consisting of Ca, Sr, and Ba; x is within a range of $0 \leq x \leq 2$; y is within a range of $0 < y < 1$, and z is within a range of $0 \leq z \leq 1$.

7. An electrode comprising the solid electrolyte material according to claim 1.

8. The electrode according to claim 7, further comprising an active material capable of having lithium ions inserted and extracted.

9. The electrode according to claim 8, further comprising;
an active material-containing layer, the active material-containing layer comprising the active material; and
an electrolyte layer, the electrolyte layer comprising a composite electrolyte permeated into gaps among irregularities on a surface of the active material-containing layer, the composite electrolyte comprising inorganic solid particles and an organic electrolyte that are embedded into concave sections of the active material-containing layer, the inorganic solid particles being particles of the solid electrolyte material, and a mass ratio of the organic electrolyte in the composite electrolyte being from 0.1% to 20%.

10. A battery comprising:
a positive electrode layer capable of having lithium ions inserted and extracted;
a negative electrode layer capable of having lithium ions inserted and extracted; and
a Li conductive layer capable of conducting lithium ions,
at least one of the positive electrode layer, the negative electrode layer, and the Li conductive layer comprising the solid electrolyte material according to claim 1.

11. The battery according to claim 10, wherein at least one of the positive electrode layer, the negative electrode layer, and the Li conductive layer comprises a composite electrolyte, the composite electrolyte comprising the solid electrolyte material and an organic electrolyte, a mass ratio of the organic electrolyte in the composite electrolyte being from 0.1% to 20%.

12. A battery pack comprising the battery according to claim 10.

13. The battery pack according to claim 12, further comprising:
an external power distribution terminal; and
a protective circuit.

14. The battery pack according to claim 12, comprising plural of the battery, the batteries being electrically connected in series, in parallel, or in a combination of in-series and in-parallel.

15. A vehicle comprising the battery pack according to claim 12.

16. The vehicle according to claim 15, wherein the vehicle comprises a mechanism configured to convert kinetic energy of the vehicle into regenerative energy.

* * * * *